(12) United States Patent
Rajagopalan et al.

(10) Patent No.: US 10,102,111 B2
(45) Date of Patent: Oct. 16, 2018

(54) PRIORITIZING RESILIENCY TESTS OF MICROSERVICES

(71) Applicant: International Business Machines Corporation, Armonk, NY (US)

(72) Inventors: Shriram Rajagopalan, White Plains, NY (US); Saurabh Sinha, Danbury, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 103 days.

(21) Appl. No.: 15/229,936

(22) Filed: Aug. 5, 2016

(65) Prior Publication Data

US 2018/0039567 A1 Feb. 8, 2018

(51) Int. Cl.
*G06F 11/36* (2006.01)

(52) U.S. Cl.
CPC .................. *G06F 11/3672* (2013.01)

(58) Field of Classification Search
CPC .................................................. G06F 11/3672
See application file for complete search history.

(56) References Cited

U.S. PATENT DOCUMENTS

| | | | |
|---|---|---|---|
| 6,847,970 B2 | 1/2005 | Keller et al. | |
| 7,409,676 B2 | 8/2008 | Agarwal et al. | |
| 7,505,872 B2 | 3/2009 | Keller et al. | |
| 7,725,571 B1 | 5/2010 | Lewis | |
| 8,132,056 B2 | 3/2012 | Thakkar et al. | |
| 8,341,014 B2 | 12/2012 | Bobak et al. | |
| 8,537,846 B2 | 9/2013 | Sharma et al. | |
| 8,601,458 B2 | 12/2013 | Andrade et al. | |
| 8,869,035 B2 | 10/2014 | Banerjee et al. | |
| 9,143,394 B2 | 9/2015 | Deng et al. | |
| 2004/0046785 A1 | 3/2004 | Keller | |
| 2004/0049365 A1* | 3/2004 | Keller | G06F 11/0709 702/186 |
| 2004/0073870 A1* | 4/2004 | Fuh | G06F 17/227 715/230 |
| 2005/0256665 A1 | 11/2005 | Hartmann et al. | |
| 2008/0228814 A1* | 9/2008 | Raley | G06Q 10/10 |
| 2010/0094611 A1 | 4/2010 | Sankaranarayanan et al. | |
| 2012/0232679 A1 | 9/2012 | Abercrombie et al. | |
| 2013/0125097 A1 | 5/2013 | Ebcioglu et al. | |

(Continued)

OTHER PUBLICATIONS

Mesbah, A., et al., "Invariant-based automatic testing of AJAX user interfaces," ICSE 2009, May 16-24, 2009, pp. 210-220.

(Continued)

*Primary Examiner* — Viva Miller
(74) *Attorney, Agent, or Firm* — Amin, Turocy & Watson, LLP

(57) ABSTRACT

Techniques are provided for automated resiliency testing. In one example, a computer-implemented method comprises analyzing, by a system operatively coupled to a processor, an annotated state transition graph of a user interface of a microservices-based application, wherein the annotated state transition graph has edges annotated with application program interface call subgraphs. The computer-implemented method also comprises generating, by the system, an ordered list of the application program interface call subgraphs based on the analyzing.

20 Claims, 16 Drawing Sheets

(56) References Cited

U.S. PATENT DOCUMENTS

| | | | |
|---|---|---|---|
| 2014/0310559 A1* | 10/2014 | Deng | G06F 11/008 |
| | | | 714/37 |
| 2015/0081243 A1* | 3/2015 | Ganai | G06F 11/3688 |
| | | | 702/123 |
| 2015/0121401 A1 | 4/2015 | Laredo et al. | |
| 2015/0149484 A1 | 5/2015 | Kelley | |
| 2015/0261958 A1 | 9/2015 | Hale et al. | |

OTHER PUBLICATIONS

"Failure Recovery Testing Framework for Microservice-Based Applications," U.S. Appl. No. 15/048,102, filed Feb. 19, 2016, 44 pages.
List of IBM Patents or Applications Treated as Related.
Christensen, "Application Resilience in a Service-oriented Architecture," Velocity 2013 Speaker Series, 4 pages.
GITHUB.COM, "How it Works' NetflixIHystrix Wiki," Retrieved: May 29, 2018, 9 pages.
GITHUB.COM, "HYSTRIX Defend Your App," Retrieved: May 29, 2018, 4 pages.
Office Action for U.S. Appl. No. 15/229,958 dated Jun. 4, 2018, 28 pages.

\* cited by examiner

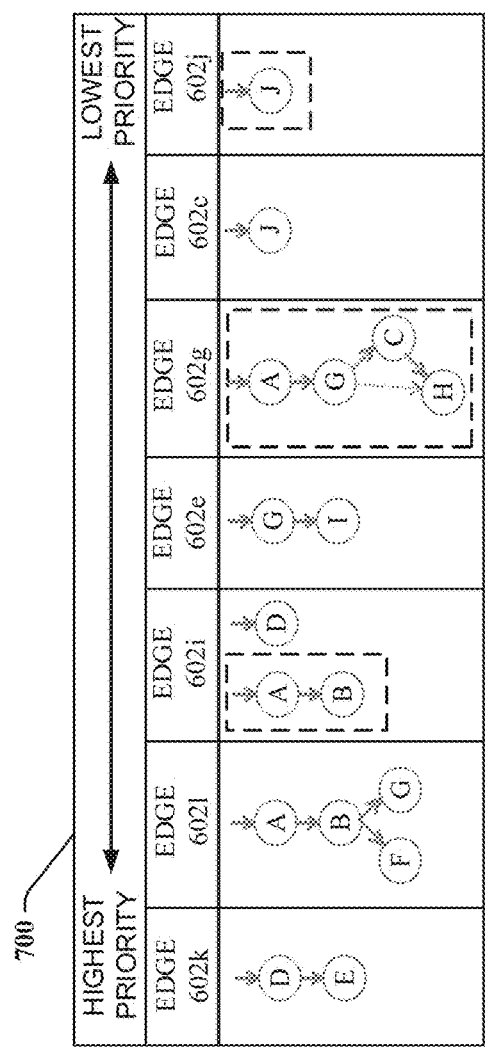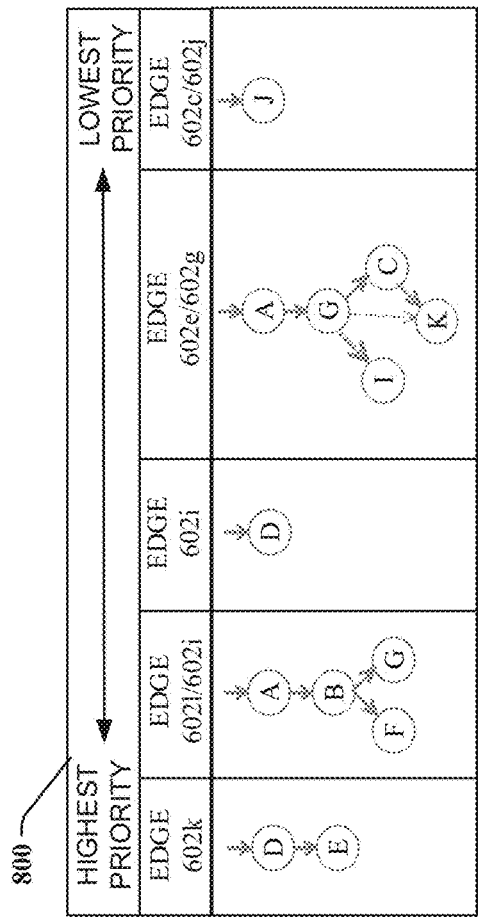
FIG. 8A
FIG. 8B

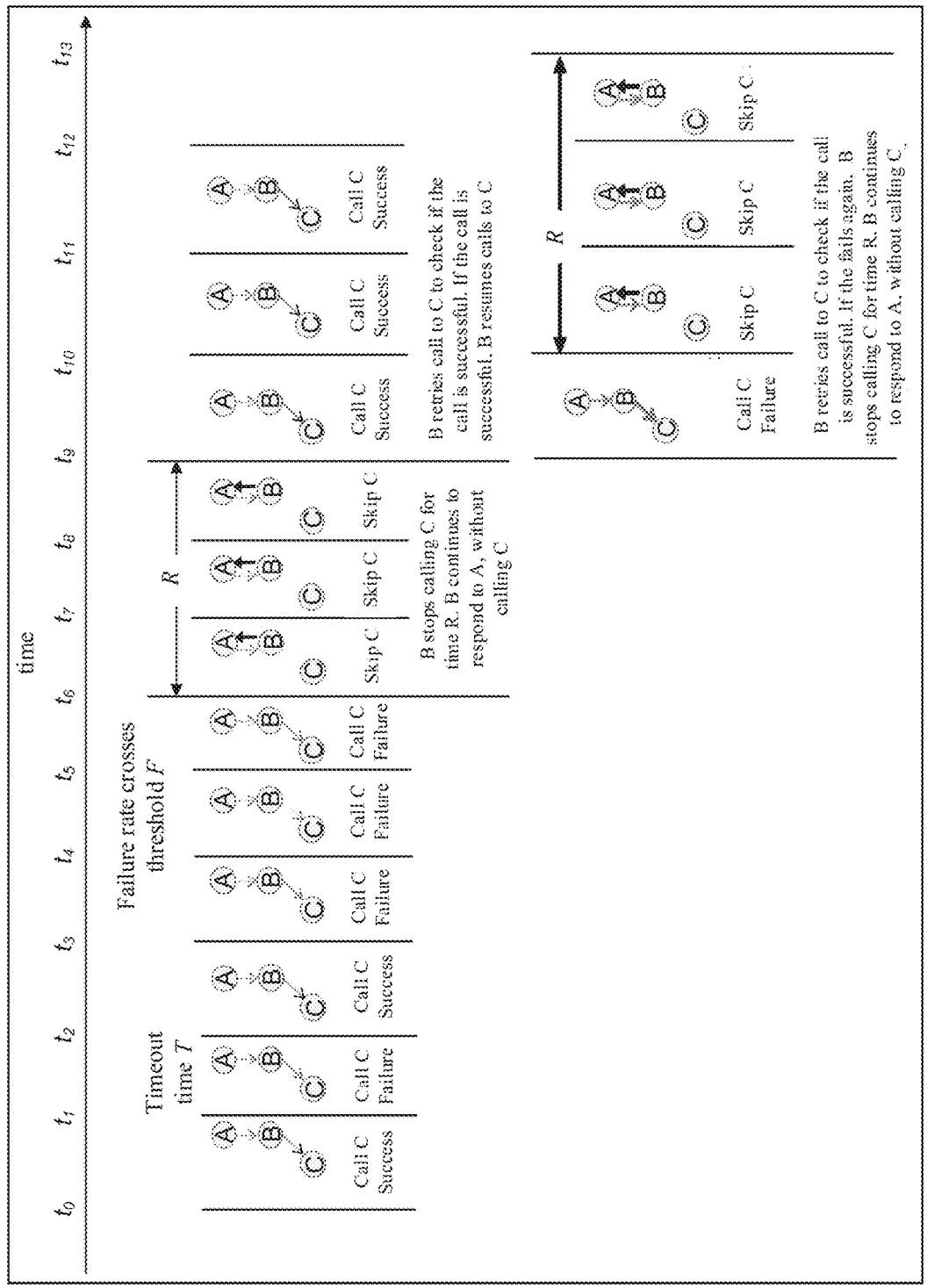
FIG. 9 TIMEOUT, BOUNDRY RETRY AND CIRCUIT BREAKER PATTERNS

RESILIENCY TESTING OF AN API CALL SUBGRAPH

PRIORITIZING RESILIENCY TESTS OF MICROSERVICES

BACKGROUND

The subject disclosure relates to prioritizing subgraphs of an application programming interface (API) calling graph for resiliency testing of microservices.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate prioritizing subgraphs of an application programming interface calling graph for resiliency testing are described.

According to an embodiment, a system is provided. The system comprises a memory that stores computer executable components; and a processor that executes the computer executable components stored in the memory. The computer executable components can comprise a prioritization component that generates an ordered list of application program interface call subgraphs associated with a user interface of a microservices-based application, wherein the application program interface call subgraphs are ordered based on respective failure impact values of the application program interface call subgraphs on a functionality of the microservices-based application. The computer executable components can also comprise a test execution component that iteratively performs in the order of the ordered list for respective application program interface call subgraphs of a subset of application program interface call subgraphs: based on at least one resiliency test pattern, generation of at least one failure scenario for an application program interface call subgraph of the subset of the application program interface call subgraphs; and, using the at least one failure scenario, test of the application program interface call subgraph.

In another embodiment a computer-implemented method is provided. The computer-implemented method can comprise analyzing, by a system operatively coupled to a processor, an annotated state transition graph of a user interface of a microservices-based application, wherein the annotated state transition graph has edges annotated with application program interface call subgraphs. The computer-implemented method can also comprise generating, by the system, an ordered list of the application program interface call subgraphs based on the analyzing.

In another embodiment, a computer program product for prioritizing application program interface call subgraphs associated with a user interface of a microservices-based application for resiliency testing is provided. The computer program product can comprise a computer readable storage medium having program instructions embodied therewith. The program instructions can be executable to analyze analyzing an annotated state transition graph of the user interface of the microservices-based application, wherein the annotated state transition graph has edges annotated with application program interface call subgraphs, and generating an ordered list of the application program interface call subgraphs based on the analyzing.

DESCRIPTION OF THE DRAWINGS

FIG. 8A illustrates a block diagram of an example, non-limiting ordered list of annotated edges and API call subgraphs from an annotated state transition graph where API call subgraphs have been determined for merging in accordance with one or more embodiments described herein.

FIG. 8B illustrates a block diagram of an example, non-limiting ordered list after API call subgraphs have been merged in accordance with one or more embodiments described herein.

FIG. 9 illustrates a block diagram of example, non-limiting correct operations of a timeout pattern, bounded retry pattern, and circuit breaker pattern for an API call subgraph in accordance with one or more embodiments described herein.

DETAILED DESCRIPTION

Figure 1:
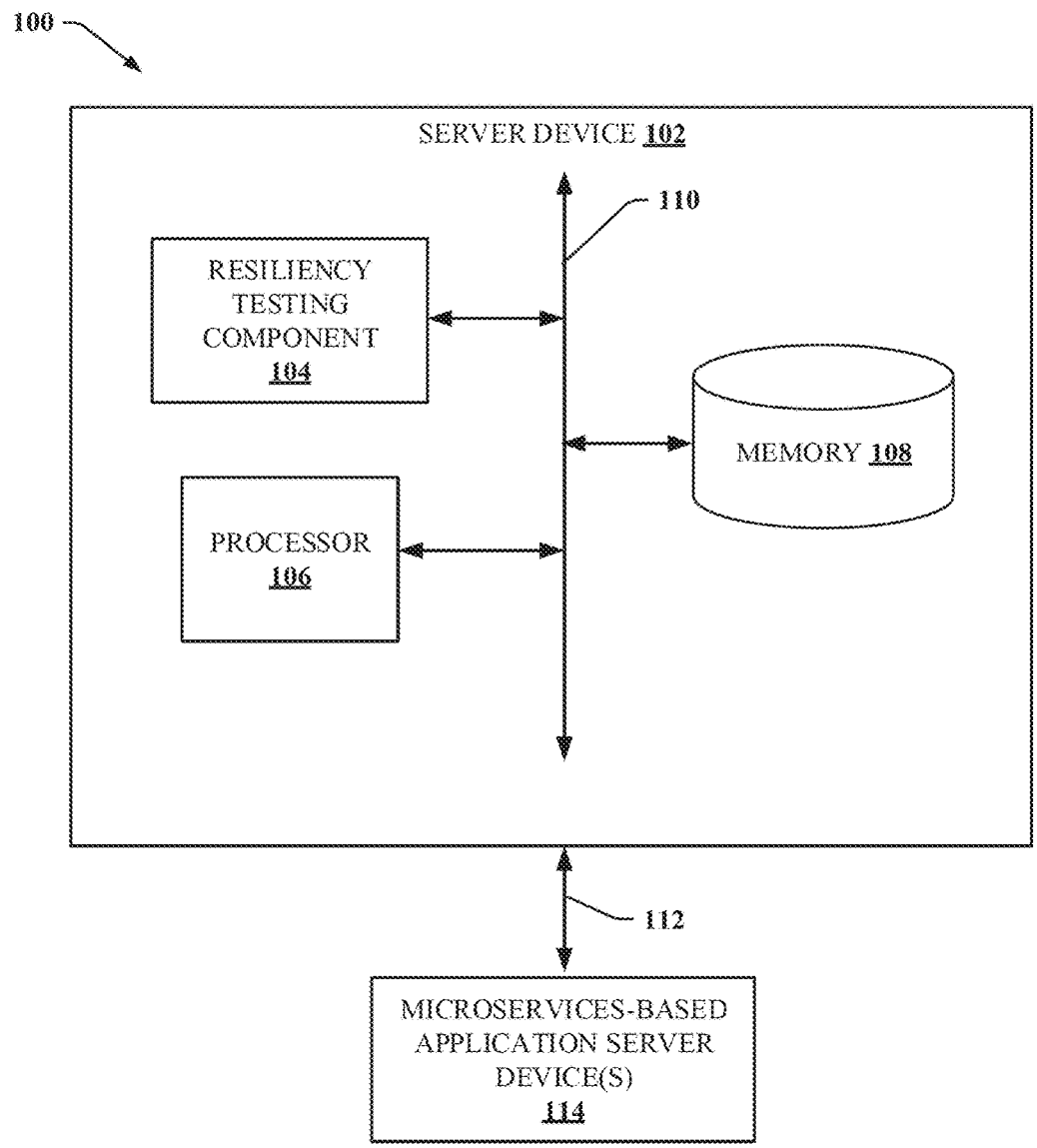
FIG. 1 illustrates a block diagram of an example, non-limiting system that facilitates prioritizing subgraphs of application programming interfaces (APIs) calling graph for resiliency testing of microservices in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident; however in various cases, that the one or more embodiments can be practiced without these specific details.

Modern web-based applications, irrespective of scale, are distributed, heterogeneous and can evolve rapidly in a matter of hours to respond to user feedback. This agility is enabled by the use of a fine-grained service-oriented architecture, referred to as a microservice architecture. A microservice is a web service that serves a single purpose, and exposes a set of APIs to other microservices, which collectively implement a given application. Each microservice of a microservice-based application is developed, deployed and managed independent of other constituent microservices of the microservice-based application. New features and updates to a microservice are continually delivered in a rapid, incremental fashion, wherein newer versions of microservices are continually integrated into a production deployment. Microservice-based applications developed in this manner are extremely dynamic as they can be updated and deployed hundreds of times a day.

Microservice-based applications, should be designed for, and tested against, failures. In the past, many popular highly available Internet services (which are implemented as a microservice-based application) have experienced failures and outages (e.g., cascading failures due to message bus overload, cascading failures due to database overload, cascading failures due to degradation of core internal services, database failures, etc.). The post-mortem reports of such outages revealed missing or faulty failure handling logic, with an acknowledgment that unit and integration testing are insufficient to catch bugs in the failure recovery logic.

In this regard, microservice-based applications should be subjected to resiliency testing, which involves testing the ability of the application to recover from failure scenarios commonly encountered. However, splitting a monolithic application into microservices typically creates a dynamic software development environment that poses key challenges to resiliency testing due to the runtime heterogeneity of the different microservices and the volatility of the code base. Indeed, microservice-based applications are typically polyglot, wherein application developers write individual microservices in the programming language they are most comfortable with. Moreover, a frequent experimentation and incremental software update delivery model results in microservices being constantly updated and redeployed, leaving the code base in a constant state of flux. This runtime heterogeneity and high code churn of microservices makes resiliency testing a microservice-based application highly problematic and non-trivial. In a non-limiting example, an amount of time available and/or automated test execution resources available can be limited to perform resiliency testing on modifications to a microservice-based application prior to deployment in a live environment for employment of the microservices-based application by end users. For example, the amount of time available to perform resiliency testing can be on the order of a few minutes with insufficient automated test execution resources available to perform resiliency testing on the entire microservices-based application in the amount of time available.

There are various challenges for resiliency testing of a microservice-based application. While a microservice-based application is fundamentally a distributed application, a microservice-based application differs from distributed file systems, distributed databases, distributed co-ordination services, etc. The latter group of applications have complex distributed state machines with a large number of possible state transitions. While existing tools for resiliency testing cater to the needs of these traditional low-level distributed applications, we find these tools to be unsuitable for use in web/mobile focused microservice applications, due to various challenges, as follows.

To address the challenges in resiliency testing of a polyglot distributed application as described herein, one or more exemplary embodiments of the invention provide resiliency testing frameworks that operate irrespective of the platform and/or logic of an application. These resiliency testing frameworks can take into consideration that irrespective of runtime heterogeneity, all communication between constituent microservices of a microservice-based application occurs entirely over a network. The constituent microservices can work in coalition to generate a response to an end user request. Accordingly, based on the reliance of the constituent microservices to communicate through messages on a network, one or more embodiments described herein can implement resiliency testing protocols that can emulate different types of application-level failures by intercepting and manipulating network messages/interactions between communicating microservices. For example, a network partition can be created by dropping all packets between two groups of microservices, while allowing communication within each group.

Furthermore, despite the rapid rate at which a microservice-based application evolves in a daily fashion (e.g., high code volatility), the interaction between constituent microservices of the microservice-based application can be characterized using a few simple, standard patterns such as request-response (e.g., representational state transfer (REST) over hypertext transfer protocol (HTTP), publish-subscribe using lightweight messaging systems, etc.). In this regard, it is possible to elicit a failure-related reaction from any microservice, irrespective of its application logic or runtime, by manipulating these interactions directly. For example, an overload of a first microservice (e.g., overloaded server) can be staged by intercepting requests (e.g., client HTTP requests) from a second microservice to the first microservice and returning an HTTP status code 503 "Service Unavailable" (or other error message) to the second microservice.

One or more embodiments disclosed herein leverage these observations to implement systems, computer-implemented methods and/or computer program products for resiliency testing of microservice-based applications, wherein such systems and methods for resiliency testing are essentially network-oriented, and independent of the application code and runtime. As previously noted, in a microservice-based application, a response to a user request can be a composition of responses from different microservices that communicate over a network. In one embodiment of the invention, a resiliency testing system implements a fault model that is based on application-level failures that can be observed from the network by other microservices. A resiliency testing system injects faults into the network communication channel between microservices to stage/emulate various failure modes including fail-stop/crash failures, performance/omission failures, and crash-recovery failures, which are the most common types of failures encountered by applications in modern-day web deployments. From the perspective of a microservice making an API call, failures in a target microservice or the network manifests in the form of, e.g., delayed responses, error responses (e.g., HTTP 404, HTTP 503), invalid responses, connection timeouts, a failure to establish a connection, etc. In this regard, various failure incidents such as: (i) cascading failure due to message bus overload; (ii) cascading failures due to database overload (iii) cascading failure due to degradation of a core internal service and (iv) database failures, etc. can be emulated by a set of failure modes supported by a failure recovery testing system according to an embodiment of the invention.

One or more embodiments of the subject disclosure is directed to computer processing systems, computer-implemented methods, apparatus and/or computer program products that facilitate efficiently, effectively, and automatically (e.g., without direct human involvement) prioritizing subgraphs of an application programming interfaces calling graph for resiliency testing of microservices of a microservices-based application. In a non-limiting example, resiliency tests can include timeout pattern tests, bounded retry pattern tests, circuit breaker pattern tests, bulkhead pattern tests, or any other suitable resiliency test for microservices of a microservice-based application.

In order to facilitate performing resilience testing in an environment where microservices of a microservices-based application are frequently being modified and redeployed in a live environment for employment of the microservices-based application by end users, one or more embodiments described herein include techniques involving analysis of a state transition graph and annotating the state transition graph with API call subgraphs from an API call graph. In one or more embodiments, a state transition graph of a user interface of a microservices-based application is traversed (e.g., crawled) using automated crawling techniques. The state transition graph can have nodes that respectively represent abstract user interface states and edges that respectively represent transitions between the abstract user interface states caused by user interface events. The API call graph can have nodes that respectively represent APIs and edges that respectively represent calling relations between APIs. The automated traversing can perform actions on the user interface and generate a log of user interface events, some of which invoke APIs associated with microservices and generate respective server-side request logs associated with invocation of APIs. Entries in the log of user interface events and server-side request logs can have time synchronized timestamps. The entries from the log of user interface events and server-side request logs can be merged into an aggregated log where the entries are listed in time synchronized order. The aggregated log can be analyzed to identify user interface event entries that trigger API invocations. The edges of the state transition graph can be annotated with API call subgraphs of an API call graph representing APIs invoked based on user interface events associated with the edges. Annotated edges can be assigned respective failure impact values indicative of a determined impact on the microservices-based application of a failure of an API in an API call subgraph associated with the edge. The annotated edges, along with their associated API call subgraphs, can be listed in prioritized order based on their respective failure impact values. Adjacent API call subgraphs in the ordered list can optionally be merged if they have a common API to reduce redundant resiliency testing. The API call subgraphs can be automatically tested for resiliency according to the prioritized order in the list, such that a highest prioritized portion of the API call subgraphs are tested in a limited available time prior to deployment in a live environment for employment of the microservices-based application by end users, and the remaining portion of the API call subgraphs are tested after deployment. The automatic testing for resiliency for each API call subgraph can be performed according to an algorithm that reduces redundant resiliency testing.

The computer processing systems, computer-implemented methods, apparatus and/or computer program products can employ hardware and/or software to solve problems that are highly technical in nature (e.g., adapted to perform automated prioritization and reduction in redundancy of resiliency testing for API call subgraphs of an API call graph in instances in which there is insufficient automated test execution resources available to perform resiliency testing on an entire microservices-based application in an amount of time available prior to deployment in a live environment for employment of the microservices-based application by end users) that are not abstract and that cannot be performed as a set of mental acts by a human. For example, a human, or even thousands of humans, cannot efficiently, accurately and effectively manually perform resiliency testing on an API call graph on a microservices-based application that has thousands or tens of thousands of microservices in a few minutes that are available prior to deployment in a live environment for employment of the microservices-based application by end users. One or more embodiments of the subject computer processing systems, methods, apparatuses and/or computer program products can enable the automated prioritization of API call subgraphs, automated reduction in redundancy of resiliency testing of API calls, and automated execution of resiliency testing according to the prioritization of API call subgraphs of a large and complex API call graph in a highly accurate and efficient manner. By employing automated analysis of a state transition graph and annotating the state transition graph with API call subgraphs from an API call graph to prioritize API call subgraphs, reduce in redundancy of resiliency testing of API calls, and execute resiliency testing of API call subgraphs of a large and complex API call graph, the processing time and/or accuracy associated with the existing automated resiliency testing systems is substantially improved. Further, one or more embodiments of the subject techniques can facilitate improved performance of automated resiliency testing systems that provides for more efficient usage of resiliency test processing resources in a limited available time by reducing redundancy of resiliency testing when testing large applications comprising complex API call graphs spanning across several microservices.

FIG. 1 illustrates a block diagram of an example, non-limiting system 100 that facilitates prioritizing subgraphs of an application programming interfaces calling graph for resiliency testing of microservices of a microservices-based application in accordance with one or more embodiments described herein. Aspects of systems (e.g., system 100 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. Repetitive description of like elements employed in one or more embodiments described herein is omitted for sake of brevity.

As shown in FIG. 1, the system 100 can include a server device 102, one or more networks 112 and one or more microservices-based application server devices 114. The server device 102 can include resiliency testing component 104 that can facilitate automatically prioritizing API call subgraphs, automatically reducing redundancy of resiliency testing of API calls, and automatically executing resiliency testing according to the prioritization of API call subgraphs of a large and complex API call graph with insufficient automated test execution resources available to perform resiliency testing on the entire microservices-based application in an amount of time available prior to deployment in a live environment for employment of the microservices-based application by end users. The server device 102 can also include or otherwise be associated with at least one included memory 108 that stores computer executable components (e.g., computer executable components can include, but are not limited to, the resiliency testing component 104 and associated components). The server device 102 can also include or otherwise be associated with at least one processor 106 that executes the computer executable components stored in the memory 108. The server device 102 can further include a system bus 110 that can couple the various components including, but not limited to, the resiliency testing component 104, memory 108 and/or processor 106. While a server device 102 is shown in FIG. 1, in other embodiments, any number of different types of devices can be associated with or include the components shown in FIG. 1 as part of the resiliency testing component 104. For example, microservices-based application server devices 114 can include all or some of the components of resiliency testing component 104. All such embodiments are envisaged.

Server device 102 can be any computing device that can be communicatively microservices-based application server devices 114, non-limiting examples of which can include a server computer, a computer, a mobile computer, a mainframe computer, an automated testing system, a network storage device, a communication device, a web server device, a network switching device, a network routing device, a gateway device, a network hub device, a network bridge device, a control system, or any other suitable computing device. A microservices-based application server device 114 can be any device that executes microservices, non-limiting examples of which can include server devices, and/or any other suitable device that can execute microservices. It is to be appreciated that server device 102, and/or microservices-based application server device 114 can be equipped with communication components (not shown) that enable communication between server device 102 and/or microservices-based application server device 114 over one or more networks 112.

The various components (e.g., resiliency testing component 104, memory 108, processor 106, server device 102, microservices-based application server devices 114, and/or other components) of system 100 can be connected either directly or via one or more networks 112. Such networks 112 can include wired and wireless networks, including, but not limited to, a cellular network, a wide area network (WAN) (e.g., the Internet), or a local area network (LAN), non-limiting examples of which include cellular, WAN, wireless fidelity (Wi-Fi), Wi-Max, WLAN, radio communication, microwave communication, satellite communication, optical communication, sonic communication, or any other suitable communication technology.

Figure 2:
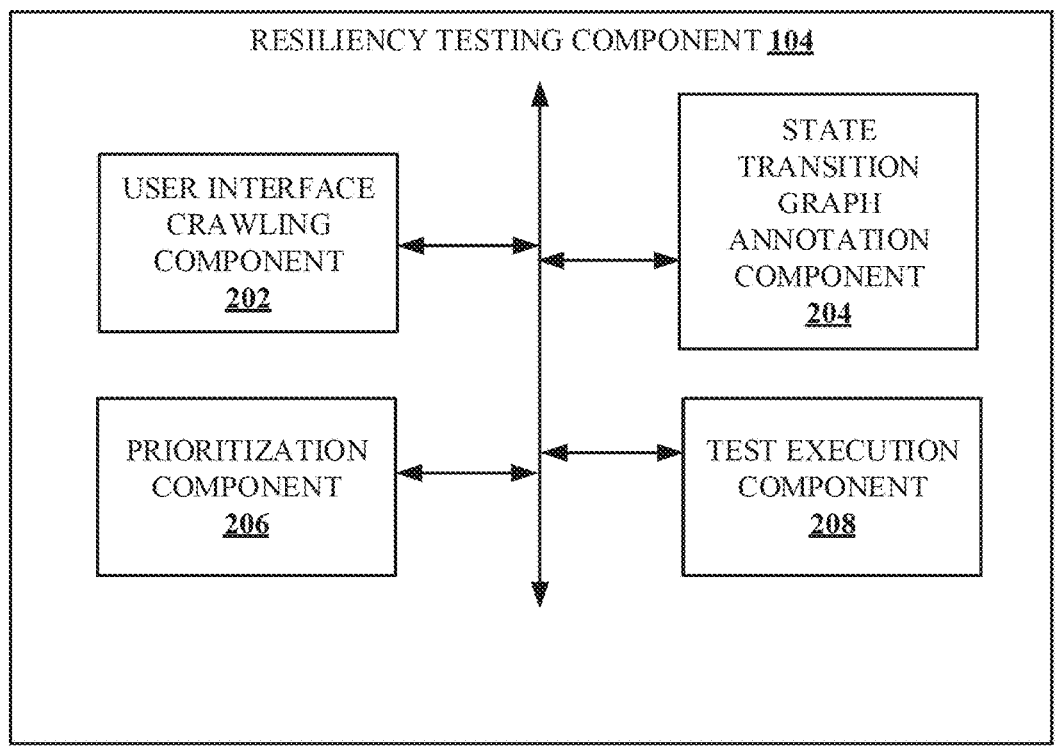
FIG. 2 illustrates a block diagram of an example, non-limiting resiliency testing component that prioritizes API call subgraphs in accordance with one or more embodiments described herein.

FIG. 2 illustrates a block diagram of an example, non-limiting resiliency testing component 104. In one or more embodiments, the resiliency testing component 104 can automatically prioritize API call subgraphs, automatically reduce redundancy of resiliency testing of API calls, and/or automatically execute resiliency testing according to the prioritization of API call subgraphs of a large and complex API call graph. The resiliency testing component 104 can perform one or more functions with insufficient automated test execution resources available to perform resiliency testing on the entire microservices-based application in an amount of time available prior to deployment in a live environment for employment of the microservices-based application by end users. Repetitive description of like elements employed in other embodiments described herein is omitted for sake of brevity.

Resiliency testing component 104 can include user interface crawling component 202 that can automatically traverse a state transition graph of a user interface of a microservices-based application. Resiliency testing component 104 can also include state transition graph annotation component 204 that can automatically annotate edges of the state transition graph with API call subgraphs of an API call graph, where the API call subgraphs represent APIs invoked based on user interface events associated with the edges. Resiliency testing component 104 can also include prioritization component 206 that can analyze an annotated state transition graph and generate a prioritized list of API call subgraphs for resiliency testing that has reduced redundant resiliency testing. Resiliency testing component 104 can also include test execution component 208 that can automatically test the API call subgraphs for resiliency according to the prioritized order in the list, such that a highest prioritized portion of the API call subgraphs are tested in a limited available time prior to deployment in a live environment for employment of the microservices-based application by end users and the remaining portion of the API call subgraphs are tested after deployment, according to an algorithm that reduces redundant resiliency testing.

User interface crawling component 202 can automatically obtain a state transition graph of a user interface of a microservices-based application. For example, user interface crawling component 202 can obtain a stored state transition graph for a user interface of a microservices-based application that was generated by an automated state transition graph generation component or generated by a user. In another example, user interface crawling component 202 can automatically generate a state transition graph for a user interface of a microservices-based application by traversing a user interface and exercising (e.g., mimicking a user performing actions) on actionable user interface elements (e.g., link, textbox, button, checkbox, combo-box, radio button, drop-down list, list box, dropdown button, toggle, date and time selector, slider, menu, free-from text field, widget, icon, search field, image carousel, tag, pagination, breadcrumb, or any other suitable user interface element) of the user interface or by analyzing traces from a user performing actions on user interface elements. The state transition graph can have nodes that respectively represent abstract user interface states and edges that respectively represent transitions between the abstract user interface states caused by user interface events (e.g., performing actions on user interface elements). For example, an abstract user interface state can be a document object model (DOM) instance. In another example, an abstract user interface state can be a simplification of a web page, such as a user's profile page but without user-specific data. In another example, an abstract user interface state can be a user interface screen of a mobile application. In another example, an abstract user interface state can be a portion of a voice user interface (VUI) of a microservices-based application. In another example, an abstract user interface state can be a portion of a gesture based user interface of a microservices-based application. It is to be appreciated that an abstract user interface state can be any suitable abstraction of a portion of any suitable user interface of a microservices-based application. In addition, the edges of the state transition graph can have annotations with user interface event information indicating which user interface events are associated with edges. For example, user interface event information annotated to an edge can indicate the user interface events that caused the transition between abstract user interface states associated with the edge, and can also provide details regarding each user interface event, such as in a non-limiting example, user interface element that was exercised, an action performed on the user interface element, a data value(s) associated with the user interface element when the user interface element was exercised, or any other suitable information associated with a user interface element, for example, that can be employed by components described herein to uniquely identify the user interface event in a user interface event log entry and/or a server-side request log entry.

Figure 4:
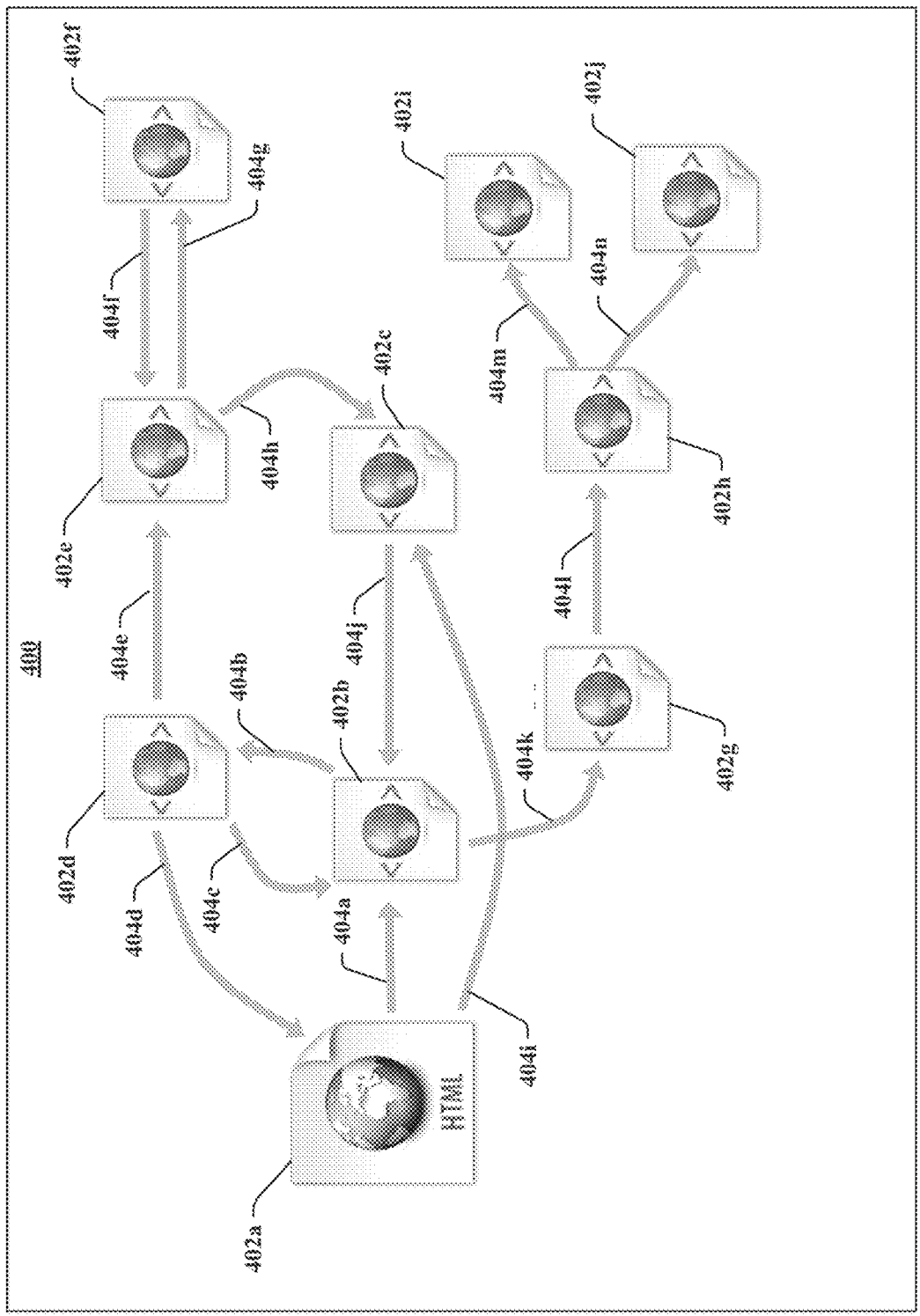
FIG. 4 illustrates a block diagram of an example, non-limiting state transition graph in accordance with one or more embodiments described herein.

FIG. 4 illustrates a block diagram of an example, non-limiting state transition graph 400 in accordance with one or more embodiments described herein. Repetitive description of like elements employed in other embodiments described herein is omitted for sake of brevity. State transition graph 400 can include abstract user interface states 402a, 402b, 402c, 402d, 402e, 402f, 402g, 402h, 402i, and 402j. State transition graph 400 can also include edges 404a, 404b, 404c, 404d, 404e, 404f, 404g, 404h, 404i, 404j, 404k, 404l, 404m, and 404n respectively representing transitions between the abstract user interface states 402a-404j caused by user interface events. While state transition graph 400 depicts a limited number of abstract user interface states and edges for illustration purposes, it is to be appreciated that state transition graph 400 can include any suitable number of abstract user interface states and edges. For example, a large and complex microservices-based application, and associated state transition graph can have thousands of abstract user interface states and edges.

Referring back to FIG. 2, user interface crawling component 202 can automatically traverse the state transition graph 400 by automated crawling techniques using a traversal pattern (e.g., depth first traversal, breadth first traversal, monte carlo tree traversal, or any other suitable tree traversal pattern) that can exercise user interface elements of the user interface corresponding to user interface events represented by the edges of the state transition graph that cause transitions between the abstract user interface states. For example, user interface crawling component 202 can exercise user interface elements associated with abstract user interface state 402a that cause traversal along edge 404i, and then execute user interface elements associated with abstract user interface state 402c that cause traversal along edge 404j, and continue to exercise user interface elements associated with abstract user interface states according to a defined traversal pattern until the entire state transition graph has been traversed. It is to be appreciated that user interface crawling component 202 can be provided access to information that enable automatically traversing certain restricted portions of the user interface, such as in a non-limiting example, login identification, password, or any other suitable information to enable automatically traversing certain restricted portions of the user interface.

Exercising user interface elements by user interface crawling component 202 can result in a user interface event log being generated by a logging agent of server device 102. User interface event log can include entries respectively representing user interface events corresponding to user interface crawling component 202 exercising user interface elements of the user interface. In a non-limiting example, user interface event log entry associated with a user interface event can include a timestamp, an event_id, a UI element name, a UI element identification, a description of action performed, or any other suitable information associated with a user interface event. Some of the user interface events can cause invocation of API calls associated with microservices on one or more microservices-based application server devices 114. The invocation of an API call associated with a microservice on a microservices-based application server device 114 can cause a logging agent on microservices-based application server device 114 to generate a server-side request log (e.g., HTTP access log format, syslog format, or any other suitable server side log) that can include entries respectively representing calls to APIs.

Figure 5:
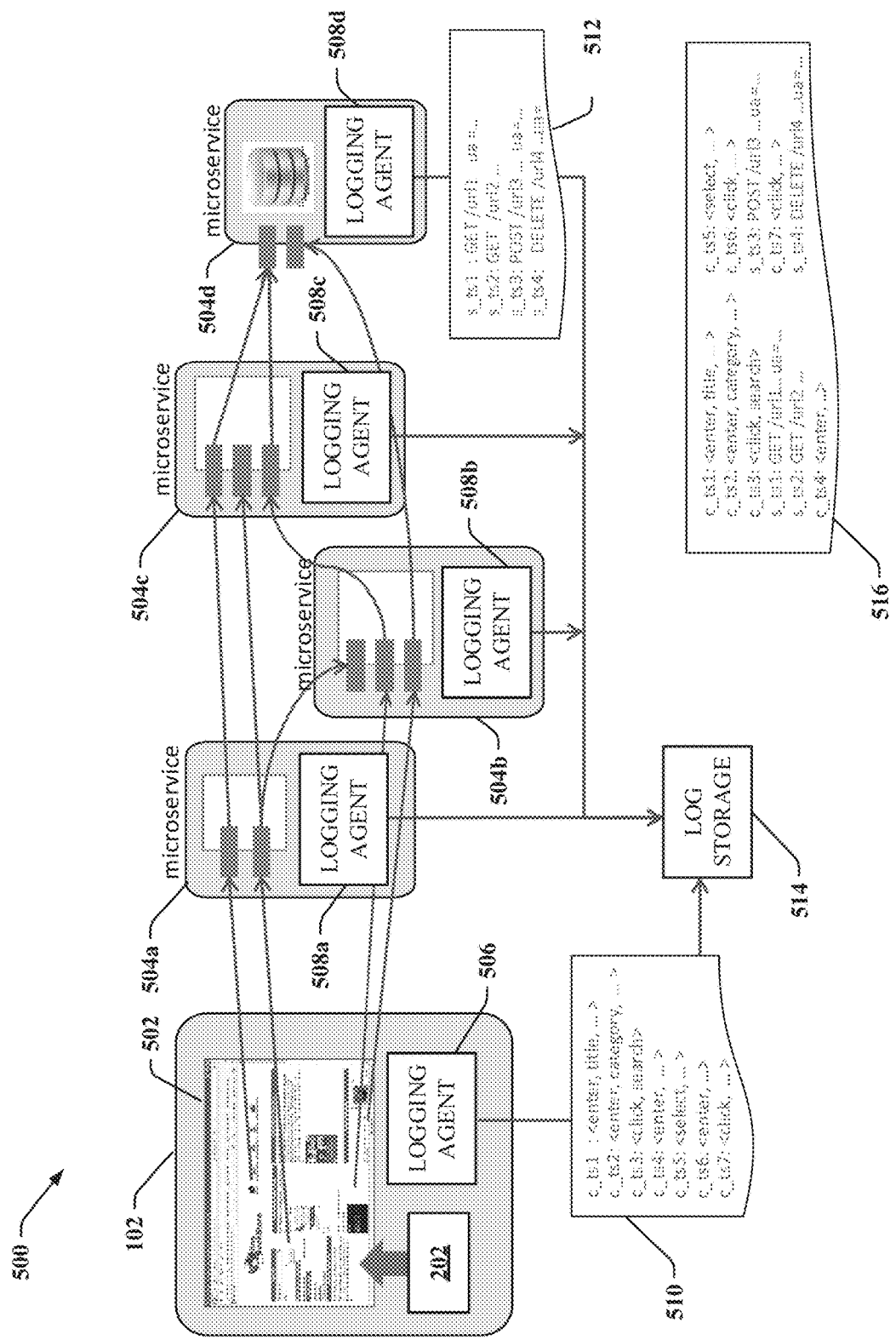
FIG. 5 illustrates a block diagram of an example, non-limiting system for testing of a microservices-based application in accordance with one or more embodiments described herein.

FIG. 5 illustrates a block diagram of an example, non-limiting system 500 for testing of a microservices-based application in accordance with one or more embodiments described herein. Repetitive description of like elements employed in other embodiments described herein is omitted for sake of brevity. System 500 can include a server device 102 and microservices 504a, 504b, 504c, 504d. Microservices 504a, 504b, 504c, and 504d can be located on one or more microservices-based application server devices 114. While system 500 depicts four microservices for illustration purposes, it is to be appreciated that system 500 can include suitable number of microservices. For example, a large and complex microservices-based application can have thousands of microservices distributed on hundreds of microservices-based application server devices 114.

Server device 102 depicts user interface crawling component 202 exercising user interface elements of user interface 502, which can cause logging agent 506 on server device 102 to generate a user interface event log 510, and also cause invocations of API calls to microservices 504a, 504b, 504c, and 504d resulting in logging agents 508a, 508b, 508c, and 508d on one or more associated microservices-based application server devices 114 to generate server-side request logs that can include entries respectively representing the API calls. For example, in the embodiment shown, logging agent 508d generated server-side request log 512 depicting API call invocations associated with microservice 504d. It is to be appreciated that some API calls can be invoked directly based on user interface events associated with user interface 502, while other API call can be invoked by microservices 504a, 504b, 504c, and 504d as a result of the API calls can be invoked directly based on user interface events. For example, a user interface event can cause an API call invocation to microservice 504a, which causes execution of microservice 504a that can invoke an API call to microservice 504c, which causes execution of microservice 504c that can invoke an API call to microservice 504d.

This non-limiting example depicts a separate logging agent 508a, 508b, 508c, and 508d for each microservices 504a, 504b, 504c, and 504d, however it is to be appreciated that a single logging agent can generate a server-side request log having entries associated with a plurality of microservices. For example, each microservices-based application server device 114 can have a logging agent that generates a server-side request log having entries associated with one or more microservices executing on microservices-based application server device 114.

The user interface events log 510 and/or server-side request log(s) 512 can be stored in log storage 514, which can include memory 108 and/or one or more memories associated with one or more microservices-based application server devices 114. Entries in the user interface events log 510 and server-side request log(s) 512 can have time synchronized timestamps. User interface crawling component 202 can merge the user interface events log 510 and server-side request log(s) 512 into an aggregated log 516 where the entries are listed in time synchronized order.

Referring back to FIG. 2, state transition graph annotation component 204 can automatically analyze aggregated log 516 to identify user interface events that trigger API call invocations. In this example, entries in the aggregated log 516 associated with user interface events can begin with "c_ts" and entries in aggregated log 516 associated with API call invocations can begin with "s_ts". It is to be appreciated that respective unique identifiers for user interface events and API call invocations can be different for different platforms (e.g., operating systems, programming languages, hardware, or any other suitable platforms) and can be defined in the system and accessible to state transition graph annotation component 204. In another non-limiting example, state transition graph annotation component 204 can employ artificial intelligence to analyze previous and/or current logs to learn respective unique identifiers for user interface events and API call invocations for different platforms.

State transition graph annotation component 204 can automatically determine that a user interface event entry immediately preceding a API call invocation entry in the aggregated log indicates a user interface event associated with the user interface event entry triggered an API call invocation associated with the API call invocation entry. Furthermore, in some embodiments, state transition graph annotation component 204 can determine that a first API call invocation entry immediately preceding a second API call invocation entry in the aggregated log indicates a first API call invocation associated with the first API call invocation entry triggered a second API call invocation associated with the second API call invocation entry, forming all or a portion of an API call invocation chain. A single API call invocation and a API call invocation chain are each an API call subgraph of an API call graph of a microservices-based application. An API call graph can have nodes that respectively represent APIs and edges that respectively represent calling relations between the APIs associated with microservices of a microservices-based application. State transition graph annotation component 204 can employ any known predefined relationships between different types of entries in aggregated logs in making determinations regarding which user interface event associated entries triggered API call invocations associated with other entries. State transition graph annotation component 204 can employ artificial intelligence to analyze previous and/or current logs to learn relationships between different types of entries in aggregated logs in making determinations regarding which user interface event associated entries triggered API call invocations associated with other entries.

Referring again to FIG. 5, for example, state transition graph annotation component 204 can automatically determine that an entry in aggregated log 516 beginning with "c_ts" immediately preceding an entry in aggregated log 516 beginning with "s_ts" can be indicative of a user interface event associated with the entry beginning with "c_ts" triggering an API call invocation associated with the entry beginning with "s_ts". For example, state transition graph annotation component 204 can determine that user interface event entry "c_ts3: <click, search>" in aggregated log 516 triggered an API call invocation chain comprising the API call invocation entry of "s_ts1: GET/url1 . . . ua= . . . " followed by the API call invocation entry of "s_ts2: GET/url2 . . . ". In another example, state transition graph annotation component 204 can determine that user interface event entry "c_ts6: <click, . . . >" in aggregated log 516 triggered the API call invocation entry of "s_ts3: POST/url3 . . . ua= . . . ". In a further example, state transition graph annotation component 204 can determine that user interface event entry "c_ts7: <click, . . . >" in aggregated log 516 triggered the API call invocation entry of "s_ts4: DELETE/url4 . . . a= . . . ".

Referring back to FIG. 2, state transition graph annotation component 204 can automatically annotate a state transition graph of a user interface of a microservices-based application with API call subgraphs of an API call graph of the microservices-based application based on an analysis of an aggregated log. State transition graph annotation component 204 can identify a user interface event entry in the aggregated log that triggered a single API call invocation or a API call invocation chain, identify an edge of the state transition graph corresponding to the user interface event based on matching data in the user interface event entry with data from the a user interface event information associated with the edge, and annotate the edge with an API call subgraph corresponding to the single API call invocation or a API call invocation chain. State transition graph annotation component 204 can analyze all or a portion of the aggregated log to identify user interface event entries in the aggregated log that triggered a single API call invocation or a API call invocation chain and annotate corresponding edges in the state transition graph. It is to be appreciated that an edge can be annotated with multiple API call subgraphs if multiple occurrences of user interface event entries associated with the edge in the aggregated log are identified by state transition graph annotation component 204 triggered a single API call invocation or a API call invocation chain.

Figure 6:
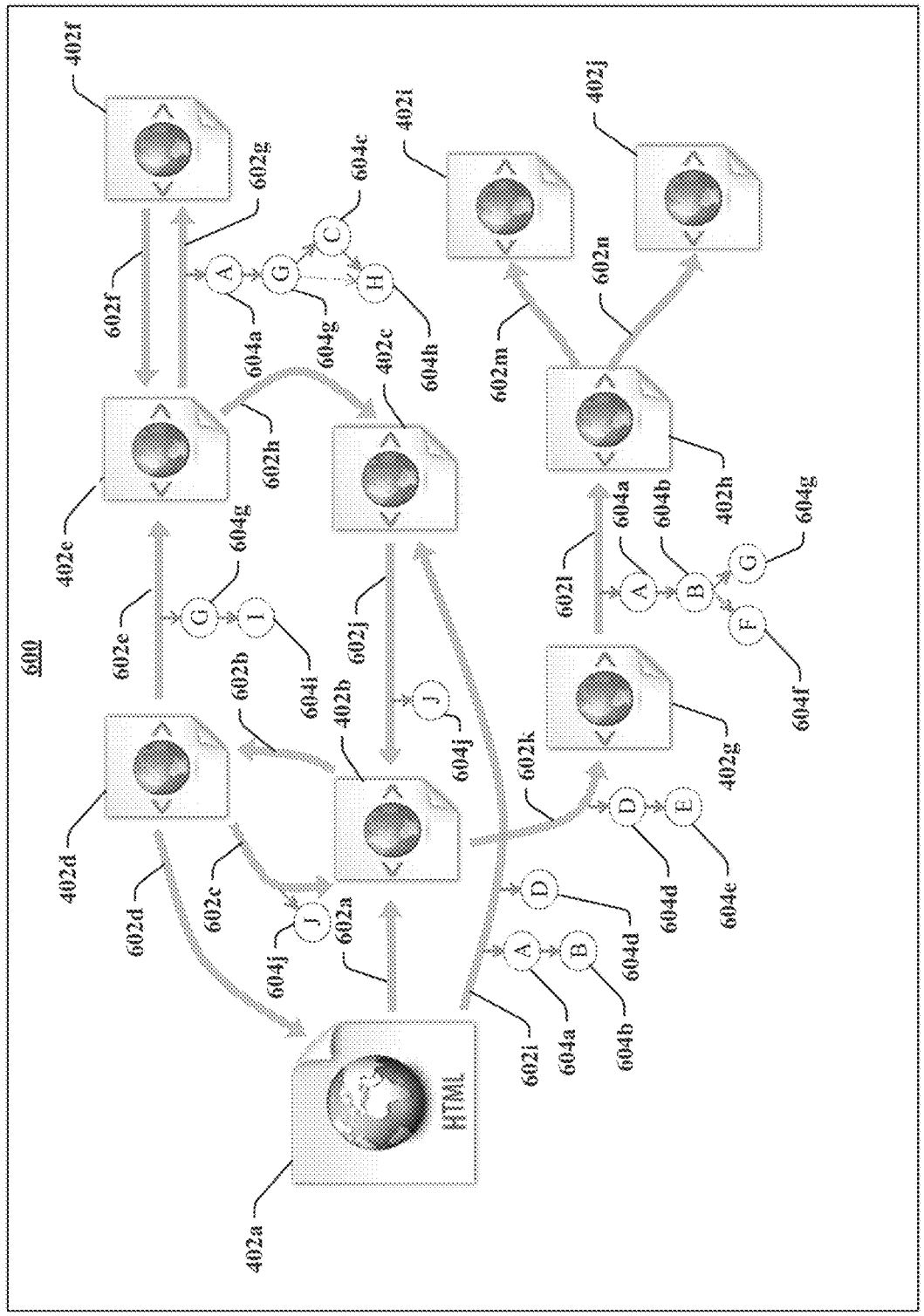
FIG. 6 illustrates a block diagram of an example, non-limiting annotated state transition graph in accordance with one or more embodiments described herein.

FIG. 6 illustrates a block diagram of an example, non-limiting annotated state transition graph 600 in accordance with one or more embodiments described herein. Repetitive description of like elements employed in other embodiments described herein is omitted for sake of brevity. Annotated state transition graph 600 corresponds to state transition graph 400 having been annotated with API call subgraphs by state transition graph annotation component 204. Edge 602i has been annotated with two API call subgraphs. The first API call subgraph annotated to edge 602i comprises a API call invocation chain that includes API "A" 604a being called by a user interface event associated with the edge 602i, and API "A" 604a calling API "B" 604b. The second API call subgraph annotated to edge 602i comprises an API "D" 604d being called by another user interface event associated with edge 602i.

Edge 602k has been annotated with an API call subgraph that comprises an API call invocation chain that includes API "D" 604d being called by a user interface event associated with the edge 602k, and API "D" 604d calling API "E" 604e.

Edge 602l has been annotated with an API call subgraph that comprises an API call invocation chain that includes API "A" 604a being called by a user interface event associated with the edge 602l, and API "A" 604a calling API "B" 604b, and API "B" 604b calling API "F" 604f and API "G" 604g.

Edge 602j has been annotated with an API call subgraph that comprises API "J" 604j being called by a user interface event associated with the edge 602j.

Edge 602c has been annotated with an API call subgraph that comprises API "J" 604j being called by a user interface event associated with the edge 602c.

Edge 602e has been annotated with an API call subgraph that comprises an API call invocation chain that includes API "G" 604g being called by a user interface event associated with the edge 602e, and API "G" 604g calling API "I" 604i.

Edge 602g has been annotated with an API call subgraph that comprises an API call invocation chain that includes API "A" 604a being called by a user interface event associated with the edge 602g, and API "A" 604a calling API "G" 604g, API "G" 604g calling API "H" 604h and API "C" 604c, and API "C" 604c calling API "H" 604h.

While annotated state transition graph 600 depicts a limited number of abstract user interface states, edges, and API call subgraphs for illustration purposes, it is to be appreciated that annotated state transition graph 600 can include any suitable number of abstract user interface states, edges, and API call subgraphs. For example, a large and complex microservices-based application, and associated state transition graph can have thousands of abstract user interface states, edges, and API call subgraphs.

Referring back to FIG. 2, prioritization component 206 can automatically analyze an annotated state transition graph and generate a prioritized list of API call subgraphs for resiliency testing that has reduced redundant resiliency testing. Prioritization component 206 can include failure impact estimation component 302 that can assign respective failure impact values to annotated edges indicative of a determined impact on the microservices-based application of a failure of an API in an API call subgraph associated with the annotated edge. Prioritization component 206 can also include ordering component 304 that can generate an order list of API call subgraphs based on the failure impact values assigned to annotated edges associated with the API call subgraphs. Prioritization component 206 can also include merging component 306 that can merge adjacent API call subgraphs in the ordered list to reduce redundant resiliency testing.

Failure impact estimation component 302 can automatically analyze an annotated state transition graph to determine for each annotated edge a failure impact value of a failure of an API in an API call subgraph associated with the annotated edge. For example, the failure impact value can be an indication of the priority of the annotated edge in the state transition graph. Failure impact estimation component 302 can employ a failure impact function that factors into account one or more failure impact criterion in making the determination of failure impact values. In a non-limiting example, a failure impact criterion can include a count of the number of abstract user interface states reachable from the annotated edge directly and/or through other edges or abstract user interface states in the annotated state transition graph. Referring again to FIG. 6, for example, annotated edge 602k can have a count of four abstract user interface states (402g, 402h, 402i, and 402j) reachable annotated edge 602k. This can be indicative that a failure of an API in an API call subgraph associated with the annotated edge 602k could cause abstract user interface states (402g, 402h, 402i, and 402j) to become unreachable. In another non-limiting example, abstract user interface states in the annotated state transition graph can be assigned respective weights which can be employed to adjust an abstract user interface state's impact on the count of abstract user interface states reachable from an annotated edge. For example, an abstract user interface state that has a weight of 50% can count as 0.5, while an abstract user interface state that has a weight of 200% can count as 2.

In another non-limiting example, a failure impact criterion can include a count of unique actionable user interface elements (e.g., user interface elements with which actions can be performed by an end user) in the abstract user interface states reachable from the annotated edge directly and/or through other edges or abstract user interface states in the annotated state transition graph. In another non-limiting example, a failure impact criterion can include a number of API calls invoked in API call subgraphs associated with an annotated edge and/or API calls invoked in API call subgraphs associated with other annotated edge reachable from the annotated edge through other edges or abstract user interface states in the annotated state transition graph.

In another non-limiting example, a failure impact criterion can include a count of user interface events, able to be triggered from a user interface state represented by a node, that are not able to be triggered from other user interface states represented by other nodes along a path from the edge to the node. For example, for respective edges of the state transition graph, failure impact estimation component 302 can determine a set of nodes of the state transition graph reachable from an edge, for respective nodes of the set of nodes, determine a count of user interface events, able to be triggered from a user interface state represented by a node, that are not able to be triggered from other user interface states represented by other nodes along a path from the edge to the node, and determine a failure impact value for the edge based on summing of the counts for the nodes of the set of nodes.

It is to be appreciated that the failure impact criterion can be pre-defined, operator specified, and/or dynamically determined by failure impact estimation component 302, for example, based on learning algorithms. Failure impact estimation component 302 can assign respective weights to failure impact criteria employed to determine a failure impact value to assign to an annotated edge. Failure impact estimation component 302 can employ any suitable learning algorithms and/or intelligent recognition techniques, any suitable information, any suitable failure impact criteria, and/or any suitable function to determine a failure impact value to assign to an annotated edge.

Ordering component 304 can automatically employ the failure impact values assigned to annotated edges to create a list of the annotated edges ordered based on the failure impact values. In a non-limiting example, ordering component 304 can order the annotated edges in the list from highest failure impact value (e.g., high priority) to a lowest failure impact value (e.g., lowest priority). Ordering component 304 can employ any suitable ordering criteria and/or function to order the annotated edges in the list based on failure impact values or any other suitable information associated with the annotated edges. It is to be appreciated that the ordering criteria and/or function can be pre-defined, operator specified, and/or dynamically determined by ordering component 304, for example, based on learning algorithms. Ordering component 304 can also order API call subgraphs associated with the annotated edges according to the order of the annotated edges in the list.

Figure 7:
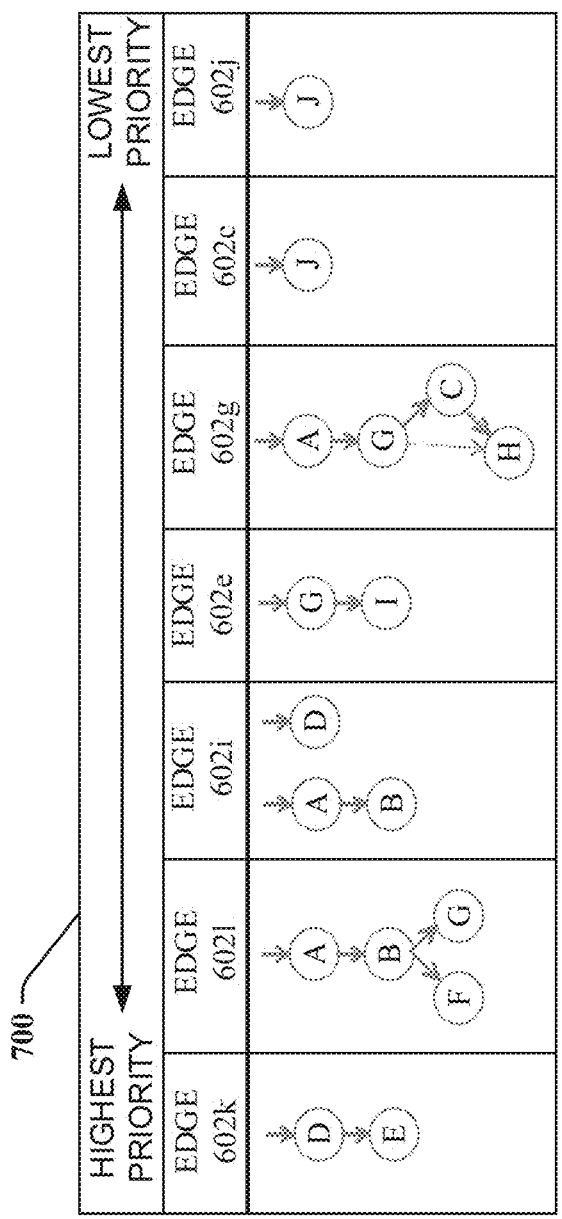
FIG. 7 illustrates a block diagram of an example, non-limiting ordered list of annotated edges and API call subgraphs from an annotated state transition graph in accordance with one or more embodiments described herein.

FIG. 7 illustrates a block diagram of an example, non-limiting ordered list 700 of annotated edges and API call subgraphs from annotated state transition graph 600 in accordance with one or more embodiments described herein. Repetitive description of like elements employed in other embodiments described herein is omitted for sake of brevity. In this example, ordering component 304 has determined the ordered list 700 such that the order of the annotated edges comprises 602*l*, 602*l*, 602*i*, 602*e*, 602*g*, 602*c*, and 602*j* from highest priority to lowest priority. Ordering component 304 has added to the ordered list 700 API call subgraphs that correspond to annotated edges 602*l*, 602*l*, 602*i*, 602*e*, 602*g*, 602*c*, and 602*j*, thus ordering the API call subgraphs from highest priority to lowest priority.

Referring back to FIG. 3, merging component 306 can automatically analyze an ordered list of API call subgraphs to determine adjacent API call subgraphs in the ordered list that can be merged based on one or more merging criterion to reduce redundant resiliency testing. In a non-limiting example, a merging criterion can be adjacent API call subgraphs in the ordered list that have a common API. In another non-limiting example, a merging criteria, can be a value associated with a utility analysis (e.g., cost/benefit analysis) associated with resiliency testing resources of performing a merging of adjacent API call subgraphs. Merging component 306 can employ any suitable merging criteria and/or function to whether to merge adjacent API call subgraphs. It is to be appreciated that the merging criteria and/or function can be pre-defined, operator specified, and/or dynamically determined by merging component 306, for example, based on learning algorithms.

FIG. 8A illustrates a block diagram of an example, non-limiting ordered list 700 of annotated edges and API call subgraphs from annotated state transition graph 600 where API call subgraphs have been determined for merging in accordance with one or more embodiments described herein. Merging component 306 has determined that adjacent API call subgraphs associated with annotated edges 602*l* and 602*l* have a common API "A", and thus can be merged. Merging component 306 has also determined that adjacent API call subgraphs associated with annotated edges 602*e* and 602*g* have a common API "G", and thus can be merged. Merging component 306 has also determined that adjacent API call subgraphs associated with annotated edges 602*c* and 602*j* have a common API "J", and thus can be merged.

FIG. 8B illustrates a block diagram of an example, non-limiting ordered list 800 corresponding to ordered list 700 after API call subgraphs have been merged in accordance with one or more embodiments described herein. Merging component 306 has merged the adjacent API call subgraphs associated with annotated edges 602*l* and 602*l*, merged the adjacent API call subgraphs associated with annotated edges 602*e* and 602*g*, and merged the adjacent API call subgraphs associated with annotated edges 602*c* and 602*j* to create ordered list 800 that reduces redundant resiliency testing. For example, redundant resiliency testing for APIs "A", "B", "G", and "J" has been reduced in ordered list 800 as compared to ordered list 700.

Referring back to FIG. 2, test execution component 208 can automatically perform resiliency testing on API call subgraphs. For example, test execution component 208 can obtain an ordered list of API call subgraphs, such as the ordered list generated by prioritization component 206 and conduct resiliency testing on API call subgraphs in the order in which the API call subgraphs are listed in the ordered list. For example, test execution component 208 can execute one or more user interface events that the triggers all or portions of an API call subgraph and perform resiliency testing on the API call subgraph. For example, test execution component 208 can perform actions on the user interface that causes execution of the one or more user interface events, or test execution component 208 can directly issue commands (e.g., HTTP requests or any other suitable commands that generate API calls) from the user interface events log entries produce by the one or more user interface events. Resiliency testing performed by test execution component 208 can include in a non-limiting example, timeout pattern tests, bounded retry pattern tests, circuit breaker pattern tests, bulkhead pattern tests, or any other suitable resiliency test for microservices of a microservice-based application. Test execution component 208 validate correct implementation of these design patterns in a given microservice-based application.

Timeout pattern testing can be used to verify that an API call invocation to a microservice completes in bounded time T so as to maintain responsiveness, and to release resources associated with the API call invocation if the API call invocation has not completed within time T. It is to be appreciated that bounded time T can be pre-defined, operator specified, and/or dynamically determined by test execution component 208, for example, based on learning algorithms.

Bounded retry pattern testing is employed to verify proper operation in the presence of transient failures in the system, by retrying an API call invocation with the expectation that the fault is temporary. The API call invocation is retried for a threshold number of times F and can be accompanied by an exponential backoff strategy to prevent overloading the target API. It is to be appreciated that threshold number of retries F can be pre-defined, operator specified, and/or dynamically determined by test execution component 208, for example, based on learning algorithms.

Circuit breaker pattern tests employed to verify proper operation when an API call invocation repeatedly fails, so that the API call invocation failure does not cascade across an API call invocation chain. When an API call invocation repeatedly fail, a circuit breaker function transitions to open mode and the API returns a cached (or default) response to its parent API. After a circuit breaker time period R, the API call invocation is retried. If the API call invocation completes successfully according to success criteria, the circuit is closed again API call invocations in the API call invocation chain are performed normally. Success criteria can be microservice and/or microservice-based application implementation dependent. In a non-limiting example, success criteria can be based on different metrics such as response times within a threshold, number of errors in a time period, or any other suitable success criteria. It is to be appreciated that circuit breaker time period R and/or success criteria can be pre-defined, operator specified, and/or dynamically determined by test execution component 208, for example, based on learning algorithms.

Bulkhead pattern tests can be employed to verify proper operation for fault isolation within an API. For example, if a shared thread pool is used to make API call invocations to multiple APIs, thread pool resources can be quickly exhausted when API call invocations to one of the API fails repeatedly. Exhaustion of the thread pool resources renders the API making the API call invocations incapable of processing new requests. A correct bulkhead pattern mitigates this issue by assigning an independent thread pool for each called API for making API call invocations to the API.

FIG. 9 illustrates a block diagram of an example, non-limiting correct operations of a timeout pattern, bounded retry pattern, and circuit breaker pattern for an API call subgraph in accordance with one or more embodiments described herein. In this example, API call subgraph comprises and API call invocation chain where API "A" calls API "B", and API "B" calls API "C". At time $t_0$, the API call invocation chain A→B→C is attempted and is successful. At time $t_1$, the API call invocation chain A→B→C is attempted and the API "B" call to API "C" fails. After bounded time T, at time $t_2$ API "B" retries the call to API "C" and is successful. This is an example of API "B" performing a correct timeout, where after the bounded time T, the call is retired thus preventing API "B" from becoming unresponsiveness to API "A". Therefore, API "B" is correctly operating according to the timeout pattern.

At time $t_3$, the API call invocation chain A→B→C is attempted and the API "B" call to API "C" fails. After bounded time T, at time $t_4$ API "B" retries the call to API "C" and the call fails again. After bounded time T, at time $t_5$ API "B" retries the call to API "C" and the call fails again. At time $t_3$, API "B" determines that it has retried the call to API "C" a threshold F number is times and stops calling API "C" but continues to respond to API "A". This is an example of API "B" performing a correct bounded retry, where after threshold F number is times, API "B" stops calls to API "C" thus preventing API "B" overloading API "C" with requests. Therefore, API "B" is correctly operating according to the bounded retry pattern.

At times $t_6$, $t_7$, and $t_8$, API "B" stops calling API "C" but continues to respond to API "A" for a circuit breaker time period R from time $t_6$. At time $t_9$, API "B" retries the call to API "C". If the call from API "B" to API "C" is successful, then after a bounded time T, at time $t_{10}$, the API call invocation chain A→B→C is attempted again, and is successful as shown in the upper portion of FIG. 9. After bounded time T, at time $t_{11}$, the API call invocation chain A→B→C is attempted again, and is successful.

If the call from API "B" to API "C" at time $t_9$ fails, at times $t_{10}$, $t_{11}$, and $t_{12}$, API "B" stops calling API "C" but continues to respond to API "A" for a circuit breaker time period R from time $t_6$. At time $t_{13}$, API "B" retries the call to API "C" (not shown).

This is an example of API "B" performing a correct circuit breaker, where after a circuit breaker time period R, API "B" retries a call to API "C" and based on failure or success of the call to API "C", API "B" resumes calls to API "C" or API "B" stops calling API "C" but continues to respond to API "A" for a circuit breaker time period R. Therefore, API "B" is correctly operating according to the circuit breaker pattern.

Figure 10:
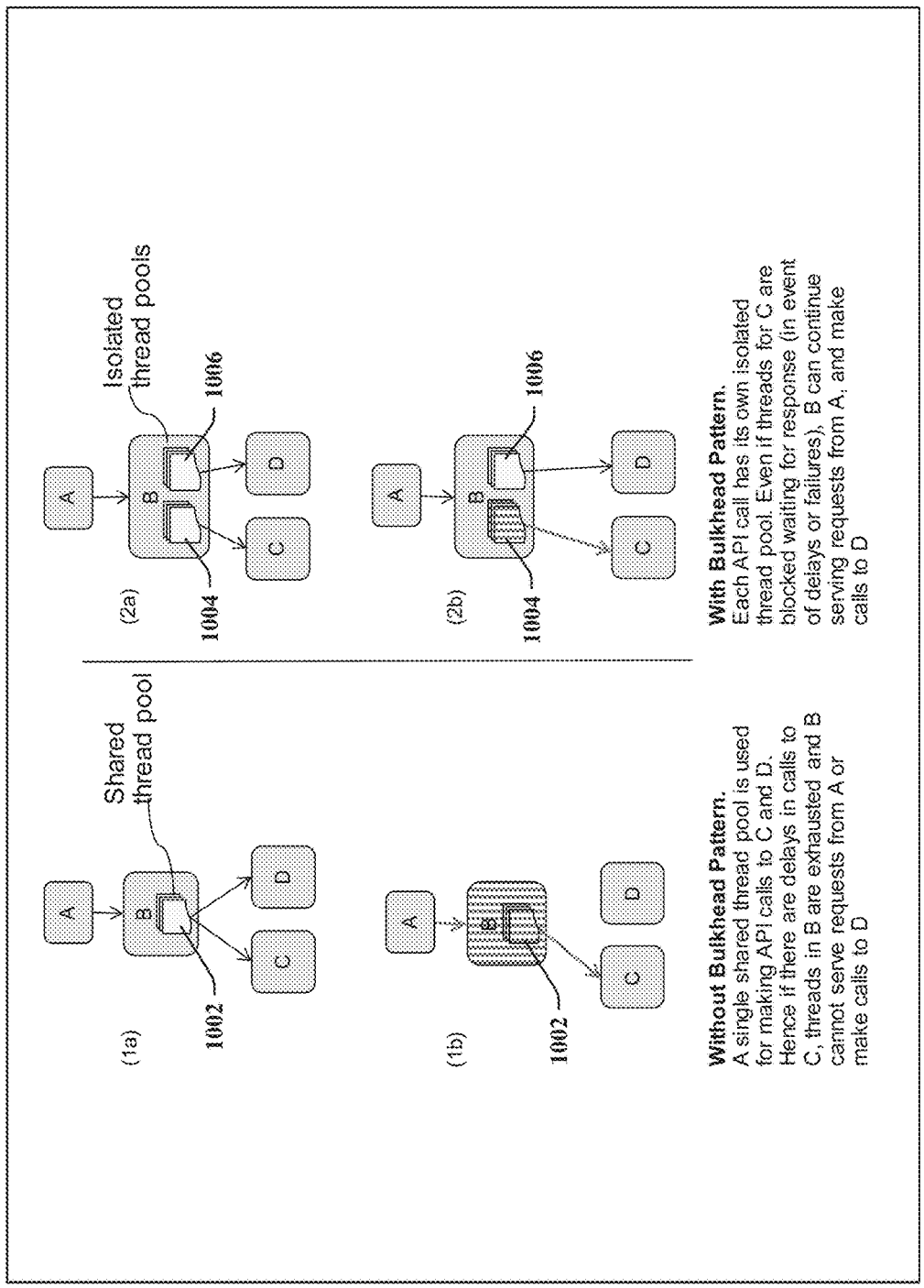
FIG. 10 illustrates a block diagram of an example, non-limiting API call subgraph with and without bulkhead pattern in accordance with one or more embodiments described herein.

FIG. 10 illustrates a block diagram of an example, non-limiting API call subgraph with and without bulkhead pattern in accordance with one or more embodiments described herein. On the left side of FIG. 10 is depicted an API call subgraph without bulkhead pattern. In (1a) the API call subgraph is depicted with a single shared thread pool 1002 used by API "B" for making calls to API "C" and API "D". As shown in (1b) by the striped lines through API "B", the single shared thread pool 1002 has no more threads for API "B" to employ, and thus API "B" cannot respond to calls from API "A" nor make calls to API "C" and API "D".

On the ride side of FIG. 10 is depicted an API call subgraph with bulkhead pattern. In (2a) the API call subgraph is depicted with a two thread pools 1004 and 1006, one thread pool 1004 used by API "B" for making calls to API "C" and another thread pool 1006 used by API "B" for making calls to API "D". As shown in (2b) by the striped lines through the thread pool 1004 used by API "B" for making calls to API "C", thread pool 1004 has no more threads for API "B" to employ, and thus API "B" cannot make calls to API "C". However, thread pool 1006 still has threads available for API "B" to employ, and thus API "B" can responds to calls from API "A" and/or make calls to API "D". This is an example of API "B" operating according to the bulkhead pattern, by having an independent thread pool for each called API.

Test execution component 208 can perform resiliency testing on an API call subgraph by injecting fake failures in the communication between a parent API calling a dependent API. In a non-limiting example, for a timeout pattern test and/or a bounded retry pattern test, test execution component 208 can inject a fake transient failure scenario in the communication between a parent API calling a dependent API. For example, test execution component 208 can return an error code to a parent API indicating a transient failure such as an error code indicating a service overload, delay the parent API call indicating transient network congestion, terminate the Transmission Control Protocol (TCP) connection of the parent API calls for a defined period to indicate transient network connectivity issues, simulate an inability to connect to a remote microservice, simulate prolonged execution time due to temporary network delays, or any other suitable transient failure. In another non-limiting example, for a circuit breaker pattern test and/or a bulkhead pattern test, test execution component 208 can inject a fake non-transient failure scenario in the communication between a parent API calling a dependent API. For example, test execution component 208 can simulate a non-transient failure between a parent API and a dependent API, such as a connection failures due to network partition, a microservice crash, error codes to indicate internal execution error in the dependent microservice, or any other suitable non-transient failure.

Figure 11B:
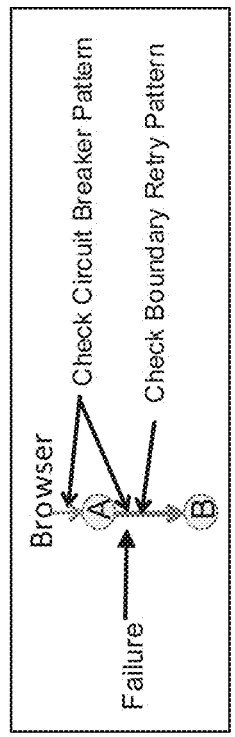
FIG. 11B illustrates a block diagram of an example, non-limiting portion of an API call subgraph for bounded retry pattern and circuit breaker pattern testing in accordance with one or more embodiments described herein.
Figure 11C:
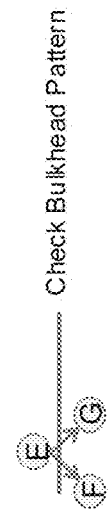
FIG. 11C illustrates a block diagram of an example, non-limiting portion of an API call subgraph for bulkhead pattern testing in accordance with one or more embodiments described herein.
Figure 11A:
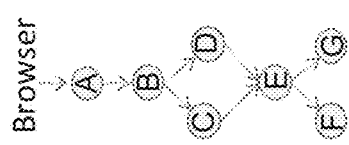
FIG. 11A illustrates a block diagram of an example, non-limiting API call subgraph in accordance with one or more embodiments described herein.

FIG. 11A illustrates a block diagram of an example, non-limiting API call subgraph in accordance with one or more embodiments described herein. Repetitive description of like elements employed in other embodiments described herein is omitted for sake of brevity. The API call subgraph depicts a call from the "Browser" to API "A", API "A" calling API "B", API "B" calling API "C" and API "D", API "C" calling API "E", API "D" calling API "E", and API "E" calling API "F" and API "G".

FIG. 11B illustrates a block diagram of an example, non-limiting portion of the API call subgraph from FIG. 11A in accordance with one or more embodiments described herein. Repetitive description of like elements employed in other embodiments described herein is omitted for sake of brevity. This example, depicts resiliency testing comprising bounded retry pattern testing and circuit breaker pattern testing performed by test execution component 208 on API "A". It is to be appreciated that bounded retry pattern testing can include timeout pattern testing due to the retry occurring after a timeout period T. Test execution component 208 can inject one or more transient failures between the call from API "A" to API "B" to test API "A" for bounded retry pattern. For example, test execution component 208 can verify that API "A" retries a call to API "B" after a timeout period T if the call fails, and that API "A" retries failed calls to API "B" a threshold number of times F and then stops making calls to API "B" to verify a bounded retry pattern for API "A". Test execution component 208 can inject one or more non-transient failures between the call from API "A" to API "B" to test API "A" for circuit breaker pattern. For example, test execution component 208 can verify that after API "A" stops making calls to API "B" after the threshold number of times F, API "A" continues to respond to the "Brower" and stops API "A" making calls to API "B" for a circuit breaker time period R, and then retries the API "A" retries the call to API "B", and is successful proceeds a normal, but if the call is unsuccessful, API "A" continues to respond to the "Brower" and stops API "A" making calls to API "B" for the circuit breaker time period R to verify a circuit breaker pattern for API "A".

FIG. 11C illustrates a block diagram of an example, non-limiting portion of the API call subgraph from FIG. 11A in accordance with one or more embodiments described herein. This example, depicts resiliency testing comprising bulkhead pattern testing performed by test execution component 208 on API "E". Test execution component 208 can inject one or more non-transient failures between the call from API "E" to API "F" or from API "E" to API "G" to test API "A" for circuit breaker pattern. For example, test execution component 208 can inject one or more non-transient failures between the call from API "E" to API "F" and verify that calls from API "E" to API "G" remain successful indicating that calls from API "E" to API "G" use a separate thread pool from a thread pool being used for calls from API "E" to API "F" to verify a bulkhead pattern for API "E".

Test execution component 208 can employ a systematic resilience testing process that reduces redundant resiliency testing when testing an API call subgraph. The systematic resilience testing process can comprise a depth first traversal pattern of the API call subgraph, where during the depth first traversal pattern at a stop at a parent API, the following are performed:
1) Perform a bounded retry pattern test on the parent API for a call to the current dependent API of the parent API in the depth first traversal pattern, record the results of the bounded retry pattern test on the parent API for a call to the current dependent API, and if the bounded retry pattern test was passed, mark the parent API as bounded retry pattern tested for the current dependent API to which the bounded retry pattern test was performed; and
    If the parent API have been marked as tested for bounded retry pattern for the current dependent API of the parent API in the depth first traversal pattern, perform a circuit breaker pattern test on the parent API for the call to the current dependent API of the parent API, record the results of the circuit breaker pattern test on the parent API for a call to the current dependent API, and if the circuit breaker pattern test was passed, mark the parent API as circuit breaker pattern tested for the current dependent API to which the circuit breaker pattern test was performed.

2) If the parent API has multiple dependent APIs, the calls to all of the direct and indirect dependent APIs of the parent API have been marked as tested for bounded retry pattern and circuit breaker retry pattern (which can be determined by the boundary pattern tested marking and the circuit breaker pattern tested marking in (1)), and the parent API is not marked as bulkhead pattern tested, perform a bulkhead pattern test on the parent API, record the results of the bulkhead pattern test on the parent API, and mark the parent API as bulkhead pattern tested.

Figure 12:
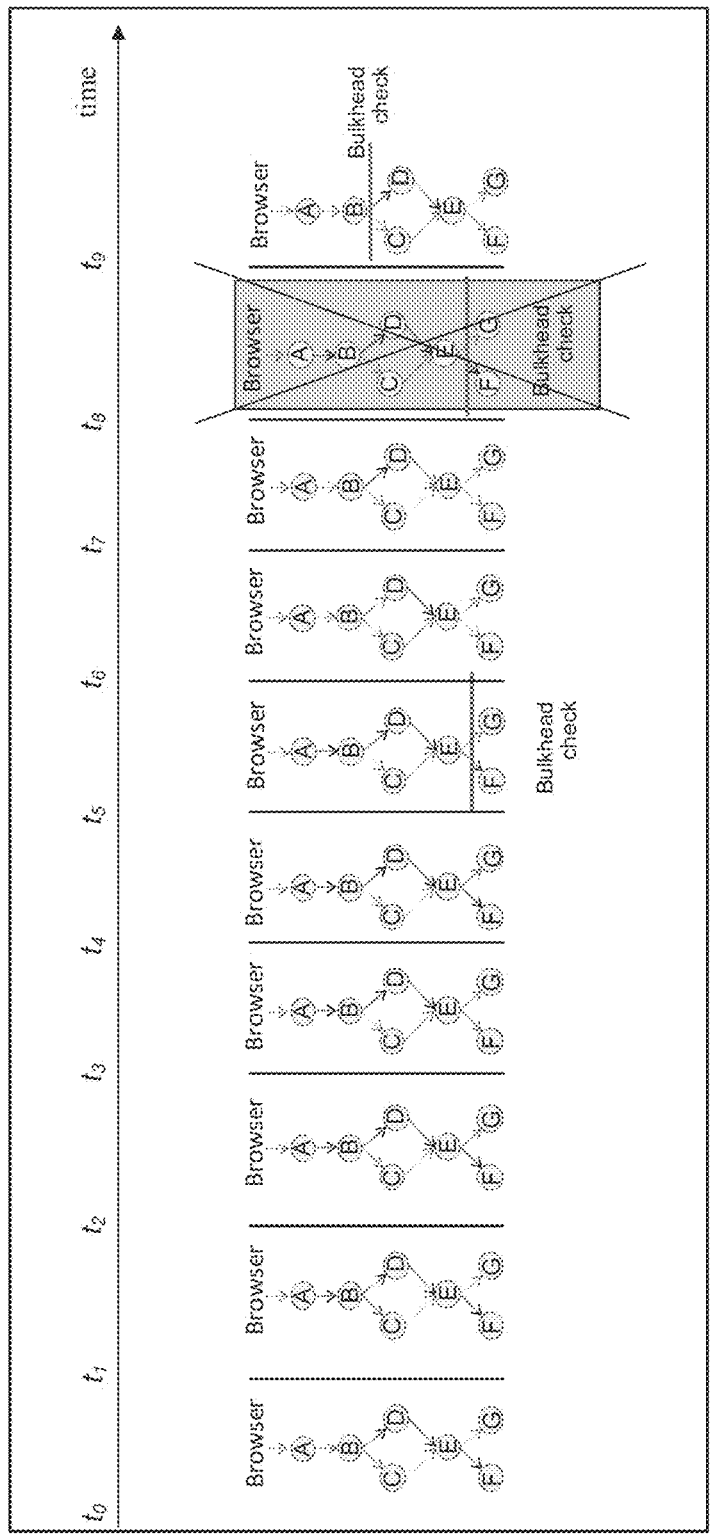
FIG. 12 illustrates a block diagram of an example, non-limiting resiliency test execution of API call subgraph in accordance with one or more embodiments described herein.

FIG. 12 illustrates a block diagram of an example, non-limiting resiliency test execution of API call subgraph from FIG. 11A by test execution component 208 using the systematic resilience testing process in accordance with one or more embodiments described herein. Repetitive description of like elements employed in other embodiments described herein is omitted for sake of brevity. At time $t_0$, test execution component 208 can perform a boundary pattern test on parent API "A" for a call to dependent API "B" and mark parent API "A" as boundary pattern tested for the call to dependent API "B", and test execution component 208 can perform a circuit breaker pattern test on parent API "A" for a call to dependent API "B" and mark parent API "A" as circuit breaker pattern tested for the call to dependent API "B".

At time $t_1$, test execution component 208 can perform a boundary pattern test on parent API "B" for a call to dependent API "C" and mark parent API "B" as boundary pattern tested for the call to dependent API "C", and test execution component 208 can perform a circuit breaker pattern test on parent API "B" for a call to dependent API "C" and mark parent API "B" as circuit breaker pattern tested for the call to dependent API "C", and test execution component 208 can determine that API "B" has not been boundary pattern tested and circuit breaker pattern tested for all of the direct and indirect dependent APIs of API "B", and thus bulkhead pattern testing is not to be performed on API "B" yet.

At time $t_2$, test execution component 208 can perform a boundary pattern test on parent API "C" for a call to dependent API "E" and mark parent API "C" as boundary pattern tested for the call to dependent API "E", and test execution component 208 can perform a circuit breaker pattern test on parent API "C" for a call to dependent API "E" and mark parent API "C" as circuit breaker pattern tested for the call to dependent API "E".

At time $t_3$, test execution component 208 can perform a boundary pattern test on parent API "E" for a call to dependent API "F" and mark parent API "E" as boundary pattern tested for the call to dependent API "F", and test execution component 208 can perform a circuit breaker pattern test on parent API "E" for a call to dependent API "F" and mark parent API "E" as circuit breaker pattern tested for the call to dependent API "F".

At time $t_4$, test execution component 208 can perform a boundary pattern test on parent API "E" for a call to dependent API "G" and mark parent API "E" as boundary pattern tested for the call to dependent API "G", and test execution component 208 can perform a circuit breaker pattern test on parent API "E" for a call to dependent API "G" and mark parent API "E" as circuit breaker pattern tested for the call to dependent API "G", and test execution component 208 can determine that API "E" has been boundary pattern tested and circuit breaker pattern tested for all of the direct and indirect dependent APIs of API "E", and bulkhead pattern testing has not been performed on API "E", and thus bulkhead pattern testing is to be performed on API "E" yet.

At time $t_5$, test execution component 208 can perform a bulkhead pattern test on parent API "E" and mark parent API "E" as bulkhead pattern tested.

At time $t_6$, test execution component 208 can perform a boundary pattern test on parent API "B" for a call to dependent API "D" and mark parent API "B" as boundary pattern tested for the call to dependent API "D", and test execution component 208 can perform a circuit breaker pattern test on parent API "B" for a call to dependent API "D" and mark parent API "B" as circuit breaker pattern tested for the call to dependent API "D", and test execution component 208 can determine that API "B" has not been boundary pattern tested and circuit breaker pattern tested for all of the direct and indirect dependent APIs of API "B", and thus bulkhead pattern testing is not to be performed on API "B" yet.

At time $t_7$, test execution component 208 can perform a boundary pattern test on parent API "D" for a call to dependent API "E" and mark parent API "D" as boundary pattern tested for the call to dependent API "E", and test execution component 208 can perform a circuit breaker pattern test on parent API "D" for a call to dependent API "E" and mark parent API "D" as circuit breaker pattern tested for the call to dependent API "E".

At time $t_8$, test execution component 208 can determine that API "E" has been bulkhead pattern tested already, and this bulkhead pattern testing is not to be performed on API "E" again now.

At time $t_9$, test execution component 208 can determine that API "B" has been boundary pattern tested and circuit breaker pattern tested for all of the direct and indirect dependent APIs of API "B", bulkhead pattern testing has not been performed on API "B", and perform a bulkhead pattern test on parent API "B" and mark parent API "B" as bulkhead pattern tested.

Test execution component 208 can generate electronic reports, electronic messages, notifications, and/or displays providing information describing resiliency tests executed, results of the executed resiliency tests, warnings of failed resiliency tests, or any other suitable information relating to resiliency tests executed to one or more recipients on one or more devices. For example, test execution component 208 can perform resiliency testing on API call subgraphs in a prioritized list order during an amount of time available prior to deployment in a live environment for employment of the microservices-based application by end users. At the end of the time available, test execution component 208 can transmit a report to one or more recipients on the results of completed testing of a portion of the API call subgraphs in the prioritized list. Then test execution component 208 can continue performing resiliency testing on the rest of the API call subgraphs in the prioritized list. It is to be appreciated that the report providing information describing resiliency tests executed, results of the executed resiliency tests, warnings of failed resiliency tests, recommendation regarding whether to deploy the microservices-based application to live environment, or any other suitable information relating to resiliency tests. Test execution component 208 can make determinations related to recommendations regarding whether to deploy the microservices-based application to live environment based on a utility (e.g., cost/benefit) analysis and/or risk analysis associated with the results of the executed resiliency tests.

Figure 3:
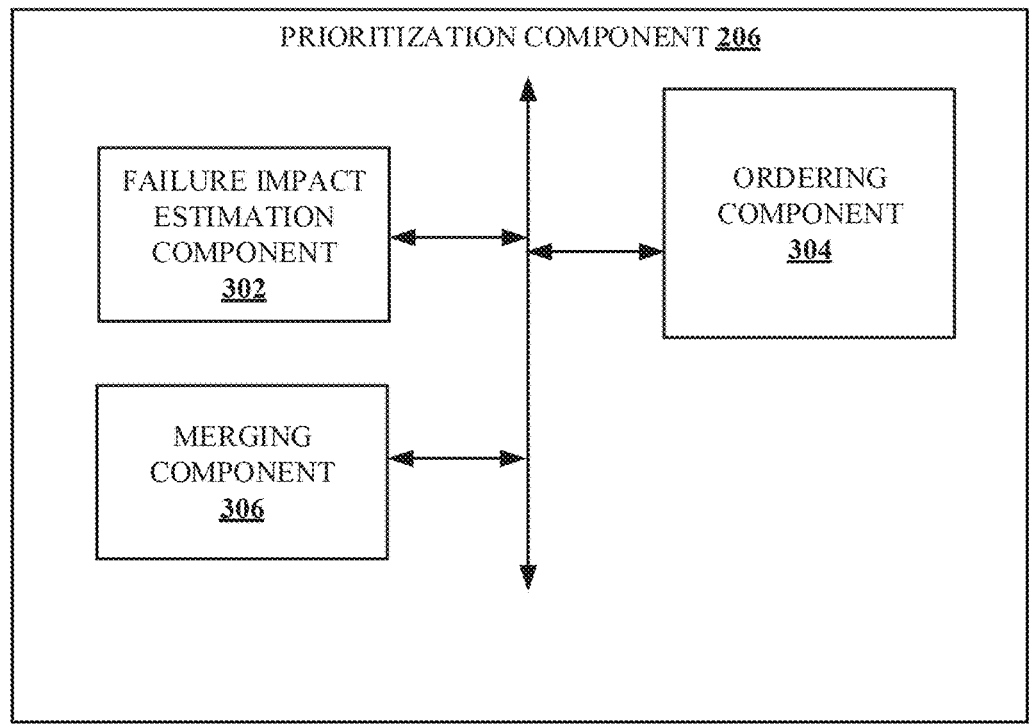
FIG. 3 illustrates a block diagram of an example, non-limiting prioritization component in accordance with one or more embodiments described herein.

While FIGS. 1, 2, and 3 depict separate components in server device 102, it is to be appreciated that two or more components can be implemented in a common component. Further, it is to be appreciated that the design of the server device 102 can include other component selections, component placements, etc., to facilitate automatically prioritizing API call subgraphs, automatically reducing redundancy of resiliency testing of API calls, and automatically executing resiliency testing according to the prioritization of API call subgraphs of a large and complex API call graph with insufficient automated test execution resources available to perform resiliency testing on the entire microservices-based application in an amount of time available prior to deployment in a live environment for employment of the microservices-based application by end users in accordance with one or more embodiments described herein. Moreover, the aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components can be combined into a single component providing aggregate functionality. The components can also interact with one or more other components not specifically described herein for the sake of brevity, but known by those of skill in the art.

Further, some of the processes performed may be performed by specialized computers for carrying out defined tasks related to automatically prioritizing API call subgraphs, automatically reducing redundancy of resiliency testing of API calls, and automatically executing resiliency testing according to the prioritization of API call subgraphs of a large and complex API call graph with insufficient automated test execution resources available to perform resiliency testing on the entire microservices-based application in an amount of time available prior to deployment in a live environment for employment of the microservices-based application by end users. The subject computer processing systems, methods apparatuses and/or computer program products can be employed to solve new problems that arise through advancements in technology, computer networks, the Internet and the like. The subject computer processing systems, methods apparatuses and/or computer program products can provide technical improvements to systems automatically prioritizing API call subgraphs, automatically reducing redundancy of resiliency testing of API calls, and automatically executing resiliency testing according to the prioritization of API call subgraphs of a large and complex API call graph with insufficient automated test execution resources available to perform resiliency testing on the entire microservices-based application in an amount of time available prior to deployment in a live environment for employment of the microservices-based application by end users by improving processing efficiency among processing components in these systems, reducing delay in processing performed by the processing components, and/or improving the accuracy in which the processing systems automatically prioritizing API call subgraphs, automatically reducing redundancy of resiliency testing of API calls, and automatically executing resiliency testing according to the prioritization of API call subgraphs of a large and complex API call graph with insufficient automated test execution resources available to perform resiliency testing on the entire microservices-based application in an amount of time available prior to deployment in a live environment for employment of the microservices-based application by end users.

It is to be appreciated that the any criteria (e.g., failure impact criteria, ordering criteria, merging criteria, success criteria, or any other suitable criteria) disclosed herein can be pre-defined, operator specified, and/or dynamically determined, for example, based on learning algorithms.

Resiliency testing component 104 can facilitate prioritizing subgraphs of an application programming interfaces calling graph for resiliency testing of multiple user interfaces of a microservices-based application. For example, a microservices-based application can have a plurality of user interfaces, respectively for differing operating systems, differing types of devices, differing applications, different types of end-users, or for any other suitable characteristic that would typically utilize a differing user interface. For example, a microservices-based application can have a first user interface for a web browser, a second user interface for a mobile phone application, and a third user interface for a desktop application. Each user interface can have its own distinct state transition graph in some embodiments. Resiliency testing component 104 can perform operations described herein separately for each user interface of a microservices-based application. For example, resiliency testing component 104 can generate respective annotated state transition graphs, respective prioritized lists of API call subgraphs, and/or respective resiliency test execution results for each user interface (or, in some embodiments, one or more user interfaces) of a microservices-based application.

The embodiments of devices described herein can employ artificial intelligence (AI) to facilitate automating one or more features described herein. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system, environment, etc. from a set of observations as captured via events and/or data. Determinations can be employed to identify a specific context or action, or can generate a probability distribution over states, for example. The determinations can be probabilistic—that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determination.

A classifier can map an input attribute vector, $z=(z1, z2, z3, z4, zn)$, to a confidence that the input belongs to a class, as by $f(z)=confidence(class)$. Such classification can employ a probabilistic and/or statistical-based analysis (e.g., factoring into the analysis utilities and costs) to determinate an action to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence can be employed. Classification as used herein also is inclusive of statistical regression that is utilized to develop models of priority.

Figure 13:
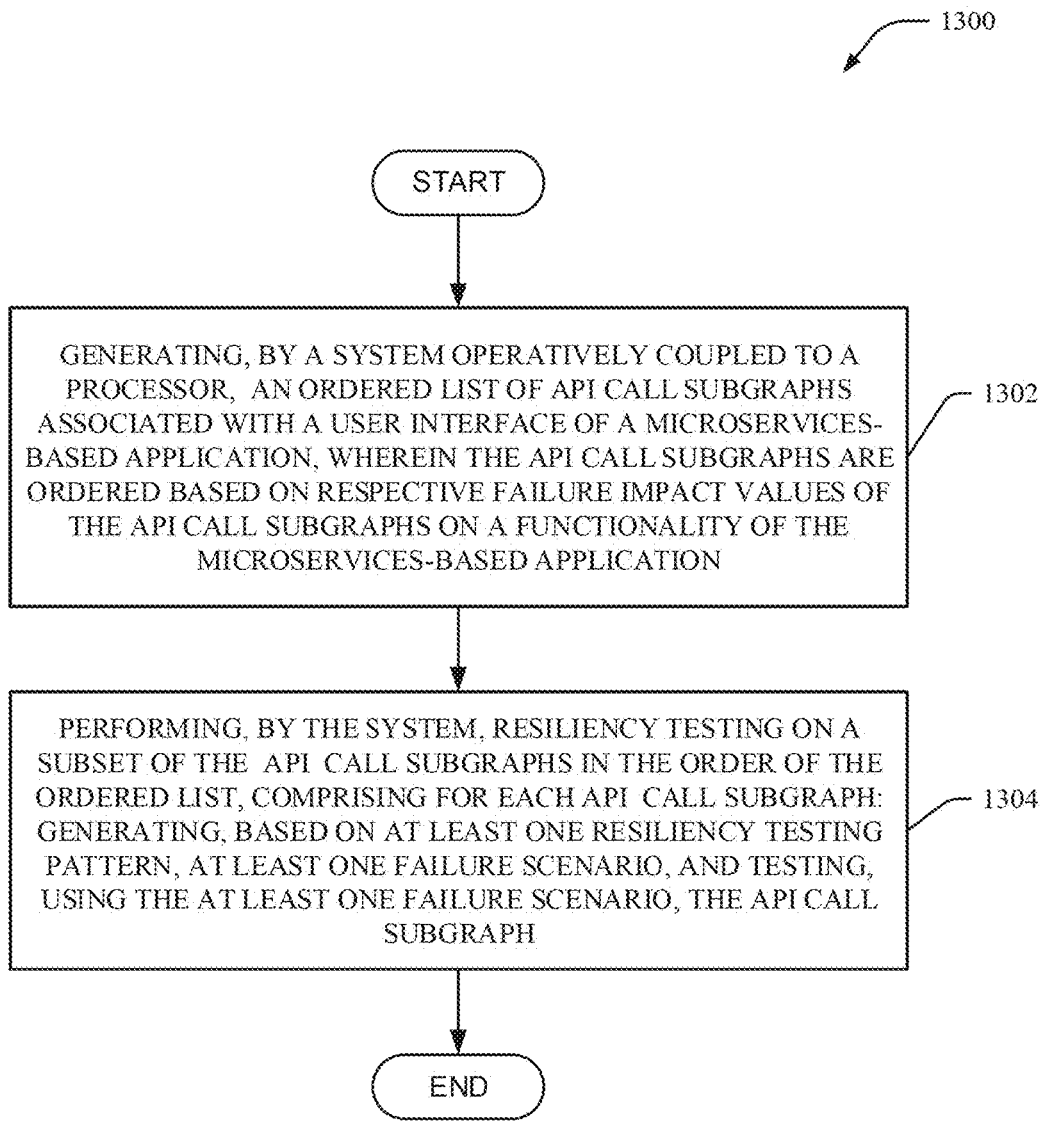
FIG. 13 illustrates a flow diagram of an example, non-limiting computer-implemented method that facilitates prioritized resiliency testing of API subgraphs of associated with a user interface of a microservices-based application in accordance with one or more embodiments described herein.

FIG. 13 illustrates a flow diagram of an example, non-limiting computer-implemented method 1300 that facilitates prioritized resiliency testing of API subgraphs of associated with a user interface of a microservices-based application in accordance with one or more embodiments described herein. Repetitive description of like elements employed in other embodiments described herein is omitted for sake of brevity.

At 1302, an ordered list of API call subgraphs associated with a user interface of a microservices-based application is generated, wherein the API call subgraphs are ordered based on respective failure impact values of the API call subgraphs on a functionality of the microservices-based application (e.g., via a user interface crawling component 202, a state transition graph annotation component 204, a prioritization component 206, a failure impact estimation component 302, an ordering component 304, a merging component 306, a resiliency testing component 104, and/or a server device 102). At 1304, resiliency testing is performed on a subset of the API call subgraphs in the order of the ordered list, comprising for each API call subgraph (or, in some embodiments, for one or more API call subgraphs): generating, based on at least one resiliency testing pattern, at least one failure scenario, and testing, using the at least one failure scenario, the API call subgraph (e.g., via a test execution component 208, a resiliency testing component 104, and/or a server device 102).

Figure 14:
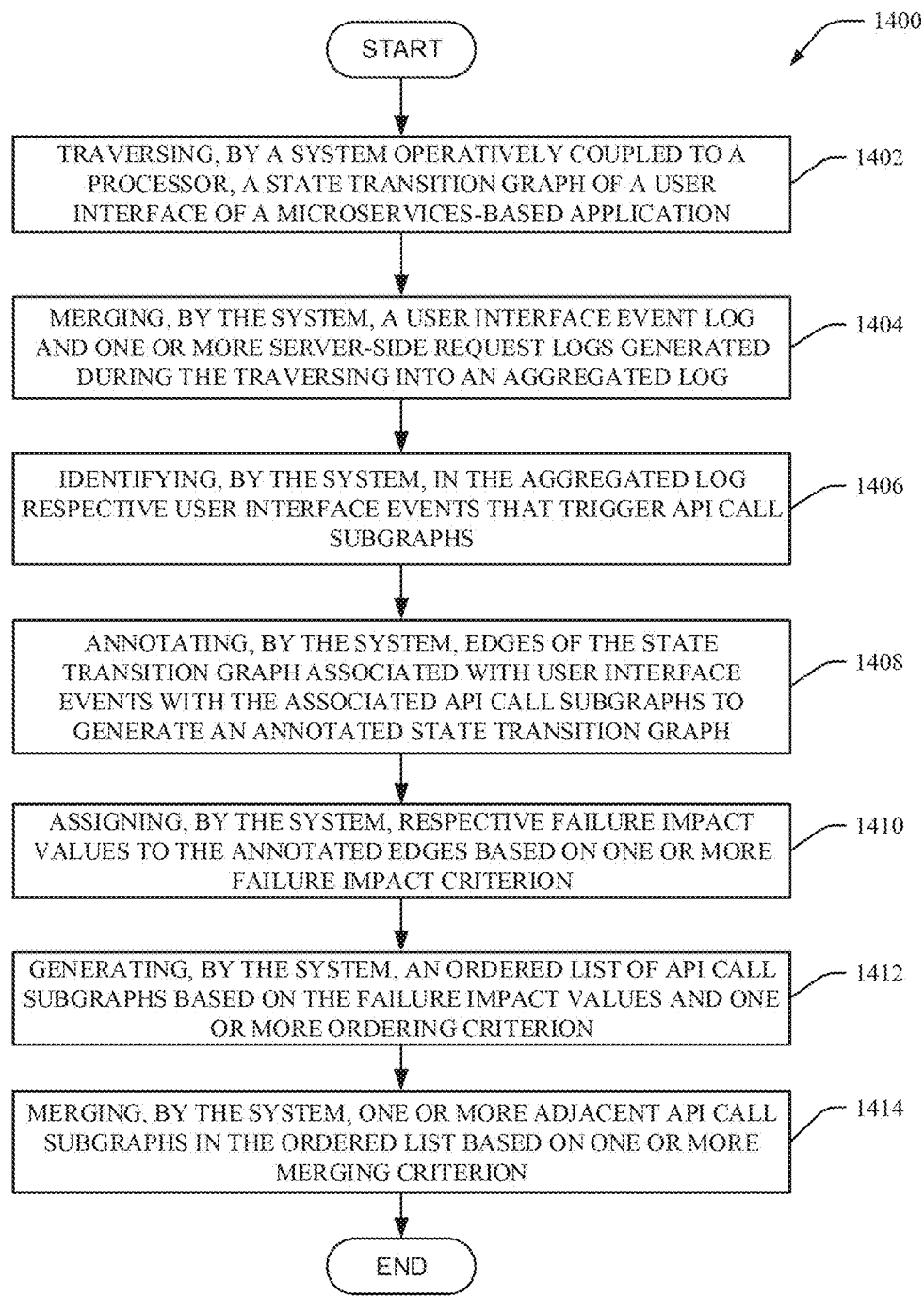
FIG. 14 illustrates a flow diagram of an example, non-limiting computer-implemented method that facilitates generating an ordered list of API subgraphs for resiliency testing of a user interface of a microservices-based application in accordance with one or more embodiments described herein.

FIG. 14 illustrates a flow diagram of an example, non-limiting computer-implemented method 1400 that facilitates generating an ordered list of API subgraphs for resiliency testing of a user interface of a microservices-based application in accordance with one or more embodiments described herein. Repetitive description of like elements employed in other embodiments described herein is omitted for sake of brevity.

At 1402, a state transition graph of a user interface of a microservices-based application is traversed (e.g., via a user interface crawling component 202, a resiliency testing component 104, and/or a server device 102). At 1404, a user interface event log and one or more server-side request logs generated during the traversing are merged into an aggregated log (e.g., via a user interface crawling component 202, a state transition graph annotation component 204, a resiliency testing component 104, and/or a server device 102). At 1406, respective user interface events that trigger API call subgraphs are identified in the aggregated log (e.g., via a state transition graph annotation component 204, a resiliency testing component 104, and/or a server device 102). At 1408, edges of the state transition graph associated with user interface events are annotated with the associated API call subgraphs to generate an annotated state transition graph (e.g., via a state transition graph annotation component 204, a resiliency testing component 104, and/or a server device 102). At 1410, respective failure impact values are assigned to the annotated edges based on one or more failure impact criterion (e.g., via a prioritization component 206, a failure impact estimation component 302, a resiliency testing component 104, and/or a server device 102). At 1412, an ordered list of API call subgraphs is generated based on the failure impact values and one or more ordering criterion (e.g., via a prioritization component 206, a failure impact estimation component 302, an ordering component 304, a resiliency testing component 104, and/or a server device 102). At 1414, one or more adjacent API call subgraphs in the ordered list are merged based on one or more merging criterion (e.g., via a prioritization component 206, an ordering component 304, a merging component 306, a resiliency testing component 104, and/or a server device 102). It is to be appreciated that the merging can be optionally performed.

Figure 15:
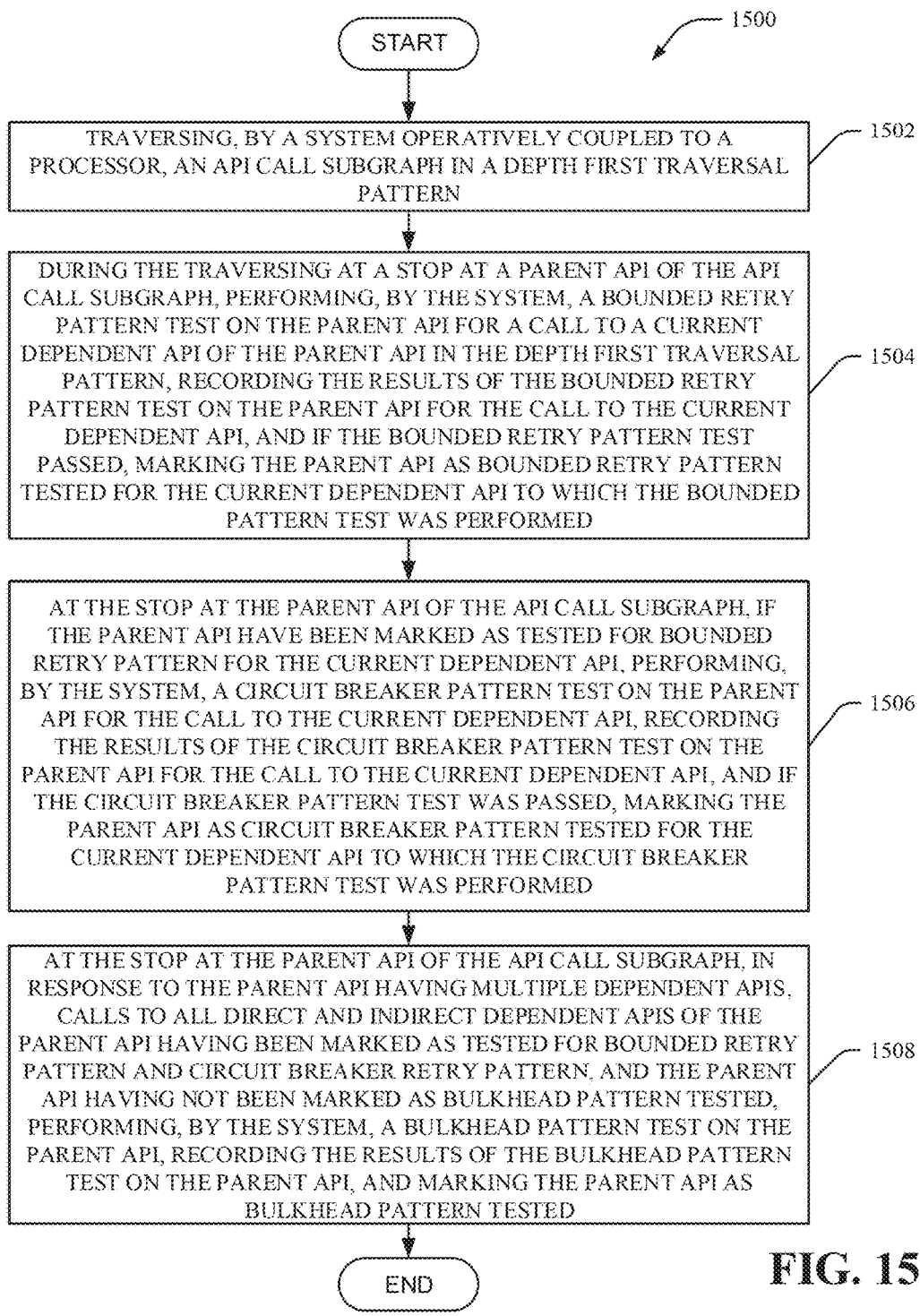
FIG. 15 illustrates a flow diagram of an example, non-limiting computer-implemented method that facilitates performing resiliency testing on an API call subgraph using the systematic resilience testing process in accordance with one or more embodiments described herein.

FIG. 15 illustrates a flow diagram of an example, non-limiting computer-implemented method 1500 that facilitates performing resiliency testing on an API call subgraph using the systematic resilience testing process in accordance with one or more embodiments described herein (e.g., via a test execution component 208, a resiliency testing component 104, and/or a server device 102). Repetitive description of like elements employed in other embodiments described herein is omitted for sake of brevity.

At 1502, an API call subgraph is traversed in a depth first traversal pattern. At 1504, method 1500 includes, during the traversing at a stop at a parent API of the API call subgraph, performing a bounded retry pattern test on the parent API for a call to a next dependent API of the parent API in the depth first traversal pattern, recording the results of the bounded retry pattern test on the parent API for the call to the current dependent API, and if the bounded retry pattern test passed, marking the parent API as bounded retry pattern tested for the dependent API to which the boundary pattern test was performed. At 1506, method 1500 includes, at the stop at the parent API of the API call subgraph, If the parent API has been marked as tested for bounded retry pattern for the current dependent API, performing a circuit breaker pattern test on the parent API for the call to the current dependent API, recording the results of the circuit breaker pattern test on the parent API for the call to the current dependent API, and if the circuit breaker pattern test was passed, marking the parent API as circuit breaker pattern tested for the dependent API to which the circuit breaker pattern test was performed. At 1508, method 1500 includes, at the stop at the parent API of the API call subgraph, in response to the parent API having multiple dependent APIs, calls to all direct and indirect dependent APIs of the parent API having been marked as tested for bounded retry pattern and circuit breaker retry pattern, and the parent API having not been marked as bulkhead pattern tested, performing a bulkhead pattern test on the parent API, recording the results of the bulkhead pattern test on the parent API, and marking the parent API as bulkhead pattern tested.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 16:
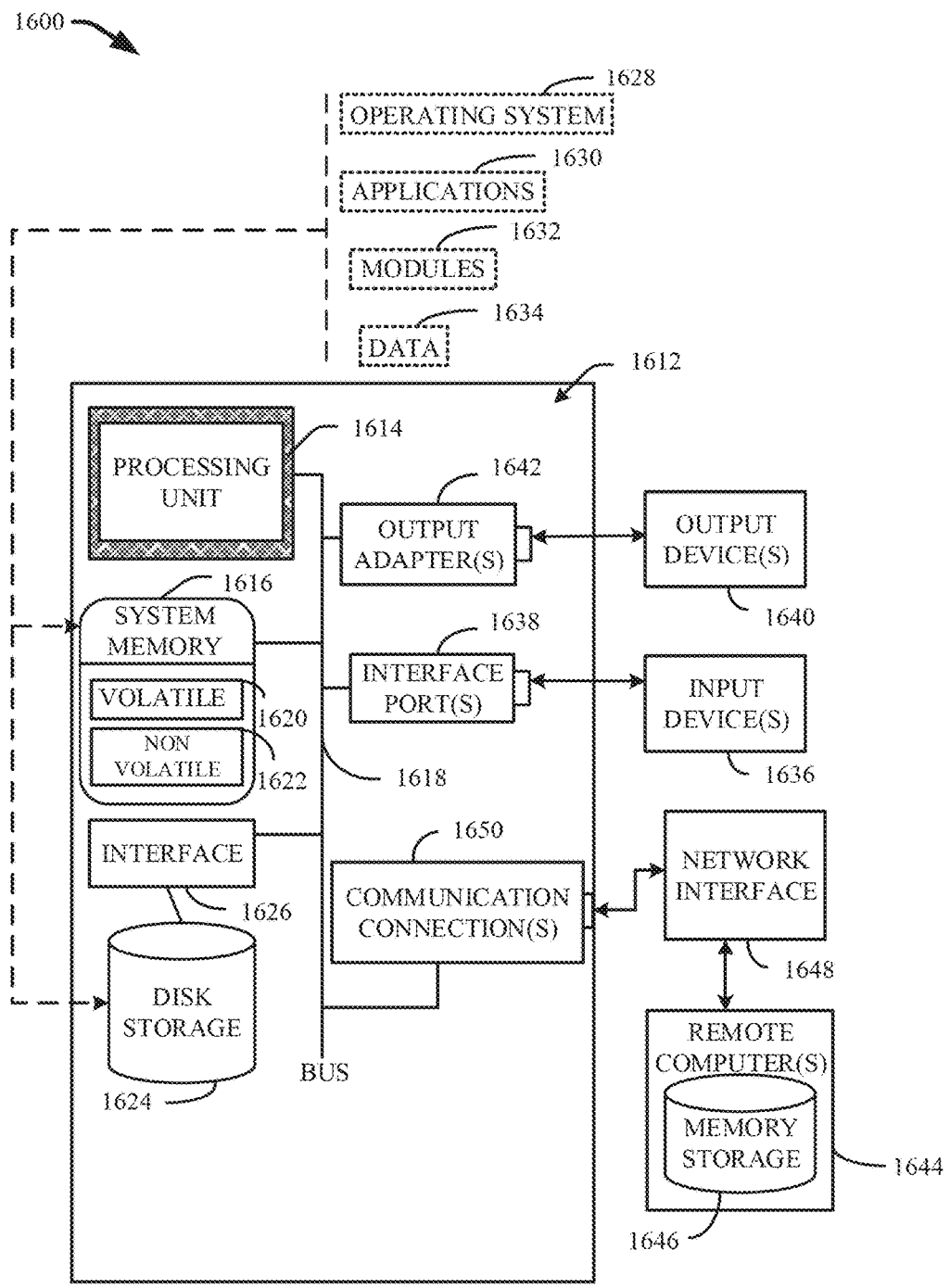
FIG. 16 illustrates a block diagram of an example, non-limiting operating environment in which one or more embodiments described herein can be facilitated.

In order to provide a context for the various aspects of the disclosed subject matter, FIG. 16 as well as the following discussion are intended to provide a general description of a suitable environment in which the various aspects of the disclosed subject matter can be implemented. FIG. 16 illustrates a block diagram of an example, non-limiting operating environment in which one or more embodiments described herein can be facilitated. Repetitive description of like elements employed in other embodiments described herein is omitted for sake of brevity.

With reference to FIG. 16, a suitable operating environment 1600 for implementing various aspects of this disclosure can also include a computer 1612. The computer 1612 can also include a processing unit 1614, a system memory 1616, and a system bus 1618. The system bus 1618 couples system components including, but not limited to, the system memory 1616 to the processing unit 1614. The processing unit 1614 can be any of various available processors. Dual microprocessors and other multiprocessor architectures also can be employed as the processing unit 1614. The system bus 1618 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1694), and Small Computer Systems Interface (SCSI). The system memory 1616 can also include volatile memory 1620 and nonvolatile memory 1622. The basic input/output system (BIOS), containing the basic routines to transfer information between elements within the computer 1612, such as during start-up, is stored in nonvolatile memory 1622. By way of illustration, and not limitation, nonvolatile memory 1622 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1620 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1612 can also include removable/non-removable, volatile/non-volatile computer storage media. FIG. 16 illustrates, for example, a disk storage 1624. Disk storage 1624 can also include, but is not limited to, devices like a magnetic disk drive, floppy disk drive, tape drive, Jaz drive, Zip drive, LS-100 drive, flash memory card, or memory stick. The disk storage 1624 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1624 to the system bus 1618, a removable or non-removable interface is typically used, such as interface 1626. FIG. 16 also depicts software that acts as an intermediary between users and the basic computer resources described in the suitable operating environment 1601. Such software can also include, for example, an operating system 1628. Operating system 1628, which can be stored on disk storage 1624, acts to control and allocate resources of the computer 1612. System applications 1630 take advantage of the management of resources by operating system 1628 through program modules 1632 and program data 1634, e.g., stored either in system memory 1616 or on disk storage 1624. It is to be appreciated that this disclosure can be implemented with various operating systems or combinations of operating systems. A user enters commands or information into the computer 1612 through input device(s) 1636. Input devices 1636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1614 through the system bus 1618 via interface port(s) 1638. Interface port(s) 1638 include, for example, a serial port, a parallel port, a game port, and a universal serial bus (USB). Output device(s) 1640 use some of the same type of ports as input device(s) 1636. Thus, for example, a USB port can be used to provide input to computer 1612, and to output information from computer 1612 to an output device 1640. Output adapter 1642 is provided to illustrate that there are some output devices 1640 like monitors, speakers, and printers, among other output devices 1640, which require special adapters. The output adapters 1642 include, by way of illustration and not limitation, video and sound cards that provide a means of connection between the output device 1640 and the system bus 1618. It should be noted that other devices and/or systems of devices provide both input and output capabilities such as remote computer(s) 1644.

Computer 1612 can operate in a networked environment using logical connections to one or more remote computers, such as remote computer(s) 1644. The remote computer(s) 1644 can be a computer, a server, a router, a network PC, a workstation, a microprocessor based appliance, a peer device or other common network node and the like, and typically can also include many or all of the elements described relative to computer 1612. For purposes of brevity, only a memory storage device 1646 is illustrated with remote computer(s) 1644. Remote computer(s) 1644 is logically connected to computer 1612 through a network interface 1648 and then physically connected via communication connection 1650. Network interface 1648 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1650 refers to the hardware/software employed to connect the network interface 1648 to the system bus 1618. While communication connection 1650 is shown for illustrative clarity inside computer 1612, it can also be external to computer 1612. The hardware/software for connection to the network interface 1648 can also include, for exemplary purposes only, internal and external technologies such as, modems including regular telephone grade modems, cable modems and DSL modems, ISDN adapters, and Ethernet cards.

Embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a server computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a memory that stores computer executable components; and
    a processor that executes the computer executable components stored in the memory, wherein the computer executable components comprise:
        a prioritization component that:
            determines respective failure impact values of application program interface call subgraphs associated with a user interface of a microservices-based application based on a failure impact function employed on an annotated state transition graph, wherein the failure impact function comprises:
                for respective edges of the state transition graph:
                    a determination of a set of nodes of the annotated state transition graph reachable from an edge,
                    for respective nodes of the set of nodes, a determination of a count of user interface events, able to be triggered from a user interface state represented by a node, that fail to be able to be triggered from other user interface states represented by other nodes along a path from the edge to the node, and
                    a determination of a failure impact value for the edge based on summing of counts for the nodes of the set of nodes; and
            generates an ordered list of the application program interface call subgraphs, wherein the application program interface call subgraphs are ordered based on the respective failure impact values; and
        a test execution component that iteratively performs in the order of the ordered list for respective application program interface call subgraphs of a subset of application program interface call subgraphs:
            based on at least one resiliency test pattern, generation of at least one failure scenario for an application program interface call subgraph of the subset of application program interface call subgraphs; and test of the application program interface call subgraph for the at least one resiliency pattern using the at least one failure scenario.

2. The system of claim 1, wherein the annotated state transition graph comprises nodes respectively representing abstract user interface states of the user interface and edges respectively representing transitions between the abstract user interface states resulting from user interface events triggered from the user interface states.

3. The system of claim 1, further comprising:
a user interface crawling component that traverses the user interface based on a state transition graph and triggers the user interface events from the user interface states; and
a state transition graph component that:
determines the application program interface subgraphs based on an analysis of one or more logs generated based on the traversing the user interface; and
annotates respective edges of the state transition graph with application program interface call subgraphs associated with user interface events that resulted in the transitions associated with the edges to generate the annotated state transition graph.

4. The system of claim 1, wherein the prioritization component orders the application program interface call subgraphs in descending order of the respective failure impact values.

5. The system of claim 1, wherein the test execution component tests nodes of the application program interface call subgraph according to a systematic resilience testing process that reduces redundant resiliency testing of application program interfaces of the application program interface call subgraph.

6. The system of claim 1, wherein the test execution component determines the subset of application program interface call subgraphs based on an amount of time available prior to deployment of the microservices-based application in a live environment.

7. The system of claim 6, wherein the test execution component transmits a recommendation to at least on recipient indicating whether to deploy the microservices-based application in the live environment, and wherein the recommendation is determined based on an analysis of results of the tests of the subset of application program interface call subgraphs for the at least one resiliency pattern.

8. A computer-implemented method, comprising:
analyzing, by a system operatively coupled to a processor, an annotated state transition graph of a user interface of a microservices-based application, wherein nodes of the annotated state transition graph respectively represent abstract user interface states of the user interface and edges of the annotated state transition graph respectively represent transitions between the abstract user interface states, and the edges are annotated with application program interface call subgraphs associated with the user interface,
wherein nodes of the application program interface call graph respectively represent application program interfaces of the microservices-based application and edges of the application program interface call graph respectively represent calling relationships between the application program interfaces;
generating, by the system, an ordered list of the application program interface call subgraphs based on the analyzing; and
executing, by the system, within a defined amount of time prior to deploying the microservices-based application in a live environment, resiliency testing on a subset of the ordered list comprising a determined highest ordered amount of application program interface call subgraphs for which the resiliency testing can be completed in the defined amount of time.

9. The computer-implemented method of claim 8, wherein the analyzing further comprises traversing, by the system, a state transition graph of the user interface of the microservices-based application.

10. The computer-implemented method of claim 9, wherein the analyzing further comprises merging, by the system, a user interface event log and one or more server-side request logs generated during the traversing into an aggregated log.

11. The computer-implemented method of claim 10, wherein the analyzing further comprises:
identifying, by the system, in the aggregated log, respective user interface events that trigger the application program interface call subgraphs; and
annotating, by the system, edges of the state transition graph corresponding to the user interface events with the triggered associated application program interface call subgraphs to generate the annotated state transition graph.

12. The computer-implemented method of claim 11, wherein the analyzing further comprises assigning, by the system, respective failure impact values to the annotated edges based on one or more failure impact criterion.

13. The computer-implemented method of claim 12, wherein the generating the ordered list of the application program interface call subgraphs is based on the failure impact values and one or more ordering criterion.

14. The computer-implemented method of claim 12, wherein the generating the ordered list of the application program interface call subgraphs further comprises merging, by the system, one or more adjacent application program interface call subgraphs in the ordered list based on one or more merging criterion.

15. A computer program product for prioritizing application program interface call subgraphs associated with a user interface of a microservices-based application for resiliency testing, the computer program product comprising a computer readable storage medium having program instructions embodied therewith, the program instructions executable by a processing component to cause the processing component to:
analyzing an annotated state transition graph of the user interface of the microservices-based application, wherein nodes of the annotated state transition graph respectively represent abstract user interface states of the user interface and edges of the annotated state transition graph respectively represent transitions between the abstract user interface states, and the edges are annotated with application program interface call subgraphs associated with the user interface,
wherein nodes of the application program interface call graph respectively represent application program interfaces of the microservices-based application and edges of the application program interface call graph respectively represent calling relationships between the application program interfaces;
generating an ordered list of the application program interface call subgraphs based on the analyzing; and
executing within a defined amount of time prior to deploying the microservices-based application in a live environment, resiliency testing on a subset of the ordered list comprising a determined highest ordered amount of application program interface call subgraphs for which the resiliency testing can be completed in the defined amount of time.

16. The computer program product of claim 15, wherein the analyzing further comprises traversing a state transition graph of the user interface of the microservices-based application; and merging a user interface event log and one or more server-side request logs generated during the traversing into an aggregated log.

17. The computer program product of claim 16, wherein the analyzing further comprises:

identifying in the aggregated log respective user interface events that trigger the application program interface call subgraphs; and annotating edges of the state transition graph corresponding to the user interface events with the triggered associated application program interface call subgraphs to generate the annotated state transition graph.

18. The computer program product of claim 17, wherein the analyzing further comprises assigning respective failure impact values to the annotated edges based on one or more failure impact criterion; and wherein the generating the ordered list of the application program interface call subgraphs is based on the failure impact values and one or more ordering criterion.

19. The computer program product of claim 17, wherein the generating the ordered list of the application program interface call subgraphs further comprises merging, by the system, one or more adjacent application program interface call subgraphs in the ordered list based on one or more merging criterion.

20. The computer program product of claim 7, wherein the executing further comprises determining the subset of application program interface call subgraphs based on an amount of time available prior to deployment of the microservices-based application in a live environment.

* * * * *